United States Patent
Yang et al.

(10) Patent No.: US 10,743,354 B2
(45) Date of Patent: Aug. 11, 2020

(54) INFORMATION PROCESSING METHOD, APPARATUS AND SYSTEM

(71) Applicant: ZTE CORPORATION, Guangdong (CN)

(72) Inventors: Ling Yang, Guangdong (CN); Wei Gou, Guangdong (CN); Yajun Zhao, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 6 days.

(21) Appl. No.: 15/751,138

(22) PCT Filed: Aug. 5, 2016

(86) PCT No.: PCT/CN2016/093426
§ 371 (c)(1),
(2) Date: Feb. 7, 2018

(87) PCT Pub. No.: WO2017/024988
PCT Pub. Date: Feb. 16, 2017

(65) Prior Publication Data
US 2018/0242372 A1    Aug. 23, 2018

(30) Foreign Application Priority Data
Aug. 7, 2015    (CN) .......................... 2015 1 0484416

(51) Int. Cl.
*H04W 74/08* (2009.01)
*H04W 16/14* (2009.01)
(Continued)

(52) U.S. Cl.
CPC ....... *H04W 74/0841* (2013.01); *H04L 5/0048* (2013.01); *H04L 27/2602* (2013.01);
(Continued)

(58) Field of Classification Search
None
See application file for complete search history.

(56) References Cited

U.S. PATENT DOCUMENTS

| 8,155,102 B1 | 4/2012 | Hakola et al. |
| 2010/0296451 A1 | 11/2010 | Li et al. |

(Continued)

FOREIGN PATENT DOCUMENTS

| CN | 101483915 A | 7/2009 |
| CN | 101772180 A | 7/2010 |
| CN | 104333902 A | 2/2015 |

OTHER PUBLICATIONS

International Search Report dated Oct. 31, 2016 for International Application No. PCT/CN2016/093426, 5 pages.
(Continued)

*Primary Examiner* — Lonnie V Sweet
(74) *Attorney, Agent, or Firm* — Knobbe, Martens, Olson & Bear, LLP

(57) ABSTRACT

Provided are an information processing method, apparatus and system. The method includes acquiring first information; and performing contention-based access and transmitting a sounding reference signal (SRS) according to the first information, where the first information includes at least one of the followings: a frame structure, a listen-before-talk (LBT) execution position, a SRS transmission position and dedicated indication signaling. The present disclosure solves a collision problem that occurs when a LBT detection position and a SRS transmission position are both on a last OFDM symbol of a subframe in the related art and achieves effects of improving a probability that a UE accesses a channel and increasing SRS transmission opportunities.

20 Claims, 4 Drawing Sheets

(51) Int. Cl.
*H04W 72/04* (2009.01)
*H04W 72/12* (2009.01)
*H04L 27/26* (2006.01)
*H04L 5/00* (2006.01)
*H04L 5/14* (2006.01)
*H04L 27/00* (2006.01)

(52) U.S. Cl.
CPC ....... *H04W 16/14* (2013.01); *H04W 72/0406* (2013.01); *H04W 72/12* (2013.01); *H04W 74/0866* (2013.01); *H04L 5/0007* (2013.01); *H04L 5/14* (2013.01); *H04L 27/0006* (2013.01)

(56) References Cited

U.S. PATENT DOCUMENTS

| | | | | |
|---|---|---|---|---|
| 2012/0082124 | A1* | 4/2012 | Kwon | H04L 5/0007 370/329 |
| 2012/0093102 | A1 | 4/2012 | Zhang et al. | |
| 2012/0300712 | A1 | 11/2012 | Hakola et al. | |
| 2014/0335876 | A1* | 11/2014 | Ratasuk | H04W 16/14 455/450 |
| 2014/0355560 | A1 | 12/2014 | Li et al. | |
| 2015/0071134 | A1 | 3/2015 | Li et al. | |
| 2015/0078219 | A1 | 3/2015 | Li et al. | |
| 2015/0110086 | A1 | 4/2015 | Li et al. | |
| 2015/0139175 | A1* | 5/2015 | Ratasuk | H04L 5/0051 370/330 |
| 2016/0219535 | A1* | 7/2016 | Zhang | H04W 72/02 |
| 2016/0278050 | A1* | 9/2016 | Nory | H04W 16/14 |
| 2017/0126379 | A1* | 5/2017 | Choi | H04L 1/00 |
| 2017/0195889 | A1* | 7/2017 | Takeda | H04W 16/14 |
| 2018/0176956 | A1* | 6/2018 | Koutsimanis | H04W 74/04 |

OTHER PUBLICATIONS

Written Opinion of the International Searching Authority dated Oct. 31, 2016 for International Application No. PCT/CN2016/093426, 3 pages.

Extended European Search Report of corresponding Patent Application No. 16834612.0—5 pages (dated Mar. 14, 2019).

ZTE, "Potential design for LAA UL transmission", 3GPP TSG RAN WG1 Meeting #80bis, R1-151719, XP050934580—5 pages (Apr. 20-24, 2015).

ZTE, "Discussion on UL transmission for LAA", 3GPP TSG RAN WG1 Meeting #81, R1-152872, XP050973755—5 pages (May 25-29, 2015).

ZTE, "Remaining Issues on LAA UL", 3GPP TSG RAN WG1 Meeting #81, R1-153437, XP050978168—6 pages (May 25-29, 2015).

* cited by examiner

INFORMATION PROCESSING METHOD, APPARATUS AND SYSTEM

CROSS REFERENCE TO RELATED APPLICATIONS

This application is the U.S. National Phase Application under 35 U.S.C. § 371 of International Application No. PCT/CN2016/093426 filed on Aug. 5, 2016, designating the U.S. and published as WO 2017/024988 A1 on Feb. 16, 2017, which claims the benefit of Chinese Patent Application No. 201510484416.X, filed on Aug. 7, 2015, which are hereby incorporated by reference in their entirety.

TECHNICAL FIELD

The present disclosure relates to communications and, in particular, to an information processing method, apparatus and system.

BACKGROUND

With the rapid growth of data services, the pressure of data transmission on licensed carriers is also increasing. Therefore, using unlicensed carriers to share data traffic on licensed carriers becomes an important evolution direction of a Long Term Evolution (LTE) system in the future. Unlicensed carriers have the following features:

1. Unlicensed spectrums do not need to be purchased, i.e., no cost is required for such spectrum resources. Thus, unlicensed carriers are featured by being free/low-cost.

2. Both individuals and enterprises can participate in deployment. Equipment of equipment producers can be deployed at will. Thus, unlicensed carriers are featured by low access requirements and low costs.

3. Unlicensed frequency bands such as 5 GHz and 2.4 GHz can all be used. Thus, unlicensed carriers are featured by a large available bandwidth.

4. Unlicensed carriers are featured by shared resources. That is, when multiple different systems or different operators of the same system are operating in unlicensed carriers, ways of resource sharing may be considered to improve the spectral efficiency.

5. Unlicensed carriers are featured by multiple radio access technologies. That is, different communication standards are involved, collaboration is difficult and network topologies are diversified.

6. Unlicensed carriers are featured by multiple radio access sites. That is, the number of users is large, collaboration difficulty is large and overheads of centralized management are large.

7. Unlicensed carriers are featured by multiple applications. That is, multiple services are mentioned to be operatable in unlicensed carriers, such as Machine to Machine (M2M) and Vehicle to Vehicle (V2V).

It can be seen that if the LTE system can use existing unlicensed carriers, potential spectrum resources of the LTE system will be improved greatly, allowing the LTE system to have lower spectrum costs.

However, before using unlicensed carriers, devices such as a base station or a user equipment (UE) in the LTE system have to meet regulatory requirements of unlicensed carriers. That is, before using unlicensed carriers to transmit information, the devices have to implement a listen-before-talk (LBT) mechanism. Furthermore, due to the progress of the $3^{rd}$ Generation Partnership Project (3GPP) Licensed Assisted Access (LAA) conference, for an uplink now, only basic uplink functions are required to ensure that the uplink works normally. Basic functions of the uplink include: an Uplink (UL) LBT process before data transmission, a sounding reference signal (SRS) for measuring an uplink channel, a physical random access channel (PRACH) and the like. For SRS transmission, SRS is mainly used to maintain uplink timing and achieve uplink and downlink scheduling (due to channel reciprocity) of the base station. Therefore, if uplink transmission is allowed, several issues need to be considered: first, how to execute LBT before uplink transmission so as to successfully transmit a SRS; second, after the LBT is executed successfully, how to transmit the SRS; and third, if the LBT and the SRS coexist in the same orthogonal frequency division multiplexing (OFDM) symbol, how to address the problem of collision between the LBT and the SRS. That is, only when the above problems are solved can uplink transmission timing be ensured, can selective scheduling of uplink frequencies (resources with good channel conditions are allocated to uplink transmission) of the base station be ensured, and can determination of Modulation and Coding Scheme (MCS) be ensured.

SUMMARY

In view of this, embodiments of the present disclosure provide an information processing method, apparatus and system capable of solving a collision problem that occurs when a LBT detection position and a SRS transmission position are both on a last OFDM symbol of a subframe in the related art and capable of achieving effects of improving a probability that a UE accesses a channel and increasing SRS transmission opportunities.

To achieve the above object, technical solutions of embodiments of the present disclosure are implemented as follows:

Embodiments of the present disclosure provide an information processing method applied to a user equipment (UE). The method includes acquiring first information; and performing contention-based access and transmitting a sounding reference signal (SRS) according to the first information, where the first information includes at least one of the following: a frame structure, a listen-before-talk (LBT) execution position, a SRS transmission position and dedicated indication signaling.

In an exemplary embodiment, the acquiring the first information includes: acquiring the first information through predefined information; or acquiring the first information based on configuration of a base station; or acquiring the first information based on configuration of the UE.

In an exemplary embodiment, the frame structure includes one of the followings: a frequency division duplex (FDD) frame structure, a time division duplex (TDD) structure and a dynamic uplink/downlink configuration frame structure which are all applied to an uplink.

In an exemplary embodiment, the LBT execution position includes: an uplink subframe; or a special subframe; or a downlink subframe.

In an exemplary embodiment, when the LBT execution position is in the uplink subframe, the LBT execution position includes: a last orthogonal frequency division multiplexing (OFDM) symbol in the uplink subframe; or last M OFDM symbols in the uplink subframe; or the last M OFDM symbols in the uplink subframe and first L OFDM symbols in a next subframe; or all OFDM symbols in the uplink subframe, where M and L are positive integers; and M and L are configured through a base station or predefined.

In an exemplary embodiment, when the LBT execution position is in the special subframe, the LBT execution position includes: a last OFDM symbol of a guard period (GP) in the special subframe; or last S OFDM symbols of the GP in the special subframe; or the last S OFDM symbols of the GP in the special subframe and t OFDM symbols in an uplink pilot time slot (UpPTS); or all OFDM symbols of the GP in the special subframe; or the all OFDM symbols of the GP in the special subframe and symbols in the UpPTS, where S and t are positive integers; and M and t are configured through a base station or predefined.

In an exemplary embodiment, when the LBT execution position is in the downlink subframe, the LBT execution position includes: a last OFDM symbol in the downlink subframe; or a specific resource element (RE) on the last OFDM symbol in the downlink subframe; or symbols occupied by a downlink pilot time slot (DwPTS) in the special subframe; or last M OFDM symbols of the DwPTS in the special subframe; or specific REs on OFDM symbols of the DwPTS in the special subframe.

In an exemplary embodiment, the transmitting the SRS includes: transmitting the SRS periodically; or transmitting the SRS aperiodically; or transmitting the SRS periodically and aperiodically; or transmitting the SRS based on a LBT execution success situation; or transmitting the SRS in a time domain position of a demodulation reference signal (DMRS).

In an exemplary embodiment, the transmitting the SRS periodically includes: transmitting the SRS according to a current SRS transmission period; or transmitting the SRS after modifying the current SRS transmission period.

In an exemplary embodiment, the transmitting the SRS aperiodically includes: triggering aperiodic SRS transmission through downlink control information (DCI); or triggering the aperiodic SRS transmission at a time when the LBT succeeds.

In an exemplary embodiment, a position where the SRS is transmitted includes one of the followings after the aperiodic SRS transmission is triggered: at least one of last k OFDM symbols in a downlink subframe; at least one of symbols in a gap between the downlink subframe and an uplink subframe; at least one of last p OFDM symbols in the uplink subframe; a SRS transmission window; a position of the DMRS in the uplink subframe; or a position of a last OFDM symbol of a first time slot in a subframe or a scheduling subframe. k and p are positive integers; k and p are configured through a base station or predefined, and k and p include at least one of the followings: 1, 2, 3, 4 and 5.

In an exemplary embodiment, the transmitting the SRS when the LBT is executed successfully includes at least one of the followings: transmitting the SRS on a first available orthogonal frequency division multiplexing (OFDM) symbol after the LBT is executed successfully and a channel is acquired; transmitting the SRS on a last OFDM symbol of a subframe after the LBT is executed successfully and the channel is acquired; transmitting the SRS on a first OFDM symbol or j OFDM symbols after the LBT is executed successfully and the channel is acquired, wherein j is a positive integer; transmitting the SRS on a resource not beyond a symbol boundary after the LBT is executed successfully and the channel is acquired; or transmitting the SRS in a SRS transmission window after the LBT is executed successfully and the channel is acquired.

In an exemplary embodiment, the SRS transmission window and/or a SRS transmission position in the SRS transmission window may be determined by at least one of the followings: a starting position of the SRS transmission window, a size of the SRS transmission window, and intervals between SRS transmission positions in the SRS transmission window.

In an exemplary embodiment, the SRS transmission window and/or the SRS transmission position in the SRS transmission window and/or the SRS transmission position may be determined by one of the following manners: configured through the base station, predefined, or notified through higher layer signaling.

In an exemplary embodiment, the SRS transmission window is configured as follows: relating determining a starting position of the SRS transmission window by a time when the LBT is executed successfully or a set transmission window position; and a size of the SRS transmission window is set so that the SRS transmission window accommodates Q OFDM symbols or less than an integer multiple of OFDM symbols, where Q is a positive integer, where the size of the SRS transmission window is determined through the following manners: configured by the base station, predefined, or configured through higher layer signaling.

In an exemplary embodiment, a frequency domain position for the SRS transmission position includes: an entire frequency domain bandwidth on which the SRS is transmitted; or a specific SRS frequency domain pattern according to which the SRS is transmitted.

In an exemplary embodiment, when both of the LBT execution position and the SRS transmission position are on a last OFDM symbol of a scheduling subframe, the method includes: a process of transmitting the SRS and a process of executing the LBT coexist on one symbol by means of frequency division; or the process of transmitting the SRS and the process of executing the LBT coexist on one symbol by means of time division In an exemplary embodiment, the SRS transmission position and a position where the UE is scheduled to execute the LBT in the next subframe coexist on one symbol by means of frequency division. The SRS is transmitted by the UE on the last OFDM symbol of the scheduling subframe, and a SRS frequency domain pattern is notified to the UE by a base station; and a clear channel assessment (CCA) detection is performed by the UE on a last OFDM symbol of a subframe previous to the scheduling subframe, and a CCA pattern is notified to the UE by the base station. A guard period is allowed to be reserved between a frequency domain resource corresponding to the process of transmitting the SRS and a frequency domain resource corresponding to the CCA detection.

In an exemplary embodiment, before the UE transmits the SRS on the last OFDM symbol of the scheduling subframe and performs a clear channel assessment (CCA), the method further includes receiving a notification message transmitted from the base station. The notification message includes at least the following information: a time domain position where the SRS is transmitted by the UE, a SRS frequency domain pattern, an index number of a resource block without signal energy or a LBT execution pattern, and the LBT execution position.

In an exemplary embodiment, when the process of transmitting the SRS and the process of executing the LBT coexist on one symbol by means of time division, the method includes: executing the LBT, by the UE, on part of resources of a last OFDM symbol of a subframe previous to the scheduling subframe; and transmitting the SRS on remaining resources if the LBT is executed successfully by the UE on the part of the resources.

In an exemplary embodiment, when the LBT execution position is on a last OFDM symbol of a subframe previous to a scheduling subframe and the SRS transmission position is on a first OFDM symbol of the scheduling subframe, the method includes: performing a corresponding LBT operation by the UE within a duration of one OFDM symbol; and transmitting a reserved signal of a non-complete symbol, and transmitting the SRS on the first OFDM symbol of the scheduling subframe according to a specific SRS frequency domain pattern or transmitting the SRS on the first OFDM symbol of the scheduling subframe throughout a frequency domain bandwidth when the UE performs a clear channel assessment (CCA) detection successfully on the last OFDM symbol of the subframe previous to the scheduling subframe and a time when the CCA detection succeeds does not beyond a symbol boundary.

In an exemplary embodiment, when the LBT execution position is on last M OFDM symbols of a scheduling subframe, the transmitting the SRS includes one of the followings: when symbols used for executing the LBT successfully occupy only part of M symbols, transmitting the SRS on remaining symbols of the M symbols or transmitting the SRS with the remaining symbols as a SRS transmission window; when the symbols used for executing the LBT successfully occupy only the part of the M symbols, transmitting a reserved signal on the remaining symbols of the M symbols and transmitting the SRS on a configured SRS resource; or when all the M symbols are occupied during the LBT process for detecting channel idleness, transmitting the SRS on the configured SRS resource, where the configured SRS resource is a configured first OFDM symbol after executing a LBT resource position or a configured last OFDM symbol of a next subframe of the LBT resource position or a configured SRS transmission window after the LBT resource position.

In an exemplary embodiment, when channel idleness is detected during a process of the LBT, the transmitting the SRS further includes one of the followings: transmitting a demodulation reference signal (DMRS) in a fourth OFDM symbol of a subframe instead of transmitting the SRS; multiplexing a DMRS resource to transmit the SRS; or transmitting the SRS in a position of a last symbol of a first time slot of the subframe.

In an exemplary embodiment, the dedicated indication signaling includes: an available state of various LBT functions and LBT parameters configured by a base station; or an available state of various LBT functions and LBT parameters configured by the UE.

In an exemplary embodiment, the various LBT functions include: having no contention back-off window; or having a fixed contention back-off window; or having a dynamic variable exponential contention back-off window.

In an exemplary embodiment, the LBT parameters include at least one of the followings: a first CCA; or a second CCA, where a configured duration of the second CCA is less than a configured duration of the first CCA; or a defer period; or N. N represents a back-off value and the value of N is predefined, configured by the base station or randomly generated.

In an exemplary embodiment, the UE executes a process of the LBT according to the available state of the various LBT functions and the LBT parameters through one of the following modes: mode 1: performing a first CCA detection only once; mode 2: performing the first CCA detection for Y times, where Y is a positive integer greater than or equal to 2; mode 3: performing extended clear channel assessment (eCCA) detection; and mode 4: performing the first CCA detection and the eCCA detection.

In an exemplary embodiment, times Y of the first CCA detection in the mode 2 is determined by a duration of the first CCA detection and a number of symbols used for executing the LBT.

In an exemplary embodiment, the eCCA includes W second CCA detection in the mode 3, where W is a positive integer. During a process of the eCCA, if the second CCA detects that a channel is busy, a defer period is entered. If channel idleness is detected in the defer period, a value of N is reduced by a preset value progressively or is not reduced by the preset value progressively. The value of N is predefined, configured by the base station or randomly generated; and the preset value is configured by the base station or predefined. Or, during the process of the eCCA, if the second CCA detects that the channel is busy, a next second CCA detection is entered rather than entering the defer period.

In an exemplary embodiment, criteria for determining that the UE acquires a right to use an unlicensed carrier include: criterion 1: if channel idleness is detected by the first CCA, the UE is determined to acquire the right to use the unlicensed carrier; criterion 2: if channel idleness is detected by one of a plurality of first CCAs, the UE is determined to acquire the right to use the unlicensed carrier; and criterion 3: if the value of N is reduced to 0 progressively, the UE is determined to acquire the right to use the unlicensed carrier.

Embodiments of the present disclosure further provide an information processing method applied to a base station. The method includes transmitting notification information to a UE, so that the UE acquires first information based on the notification information and performs contention-based access and transmits a SRS according to the first information, where the first information includes at least one of the followings: a frame structure, a LBT execution position, a SRS transmission position and dedicated indication signaling; and where the notification message includes at least the following information: a time domain position where the SRS is transmitted by the UE, a SRS frequency domain pattern, an index number of a resource block without signal energy or a LBT execution pattern, and the LBT execution position.

Embodiments of the present disclosure further provide an information processing apparatus applied to a UE. The apparatus includes an acquisition unit configured to acquire first information; and a processing unit configured to perform contention-based access and transmitting a SRS according to the first information, where the first information includes at least one of the followings: a frame structure, a LBT execution position, a SRS transmission position and dedicated indication signaling.

In an exemplary embodiment, the acquisition unit is further configured to: acquire the first information through predefined information; or acquire the first information based on configuration of a base station; or acquire the first information based on configuration of the UE.

In an exemplary embodiment, the frame structure includes one of the followings: a FDD frame structure, a TDD structure and a dynamic uplink/downlink configuration frame structure which are all applied to an uplink.

In an exemplary embodiment, the LBT execution position includes: an uplink subframe; or a special subframe; or a downlink subframe.

In an exemplary embodiment, when the LBT execution position is in the uplink subframe, a position where the LBT is executed by the processing unit includes: a last OFDM symbol in the uplink subframe; or last M OFDM symbols in the uplink subframe; or the last M OFDM symbols in the uplink subframe and first L OFDM symbols in a next subframe; or where M and L are positive integers; and M and L are configured through a base station or predefined.

In an exemplary embodiment, when the LBT execution position is in the special subframe, a position where the LBT is executed by the processing unit includes: a last OFDM symbol of the GP in the special subframe; or last S OFDM symbols of the GP in the special subframe; or the last S OFDM symbols of the GP in the special subframe and t OFDM symbols in an UpPTS; or all OFDM symbols of the GP in the special subframe; or the all OFDM symbols of the GP in the special subframe and symbols in the UpPTS, where S and t are positive integers; and S and t are configured through a base station or predefined.

In an exemplary embodiment, when the LBT execution position is in the downlink subframe, a position where the LBT is executed by the processing unit includes: a last OFDM symbol in the downlink subframe; or a specific RE on the last OFDM symbol in the downlink subframe; or symbols occupied by a DwPTS in the special subframe; or last M OFDM symbols of the DwPTS in the special subframe; or specific REs on OFDM symbols of the DwPTS in the special subframe.

In an exemplary embodiment, the processing unit is configured to transmit the SRS through one of the following manners: transmitting the SRS periodically; or transmitting the SRS aperiodically; or transmitting the SRS periodically and aperiodically; or transmitting the SRS when the LBT is executed successfully; or transmitting the SRS in a time domain position of a DMRS.

In an exemplary embodiment, the transmitting the SRS periodically includes: transmitting the SRS according to a current SRS transmission period; or transmitting the SRS after modifying the current SRS transmission period.

In an exemplary embodiment, the transmitting the SRS aperiodically includes: triggering aperiodic SRS transmission through downlink control information (DCI); or triggering the aperiodic SRS transmission when the LBT is executed successfully In an exemplary embodiment, a position where the SRS is transmitted includes one of the followings after the aperiodic SRS transmission is triggered: at least one of last k orthogonal frequency division multiplexing (OFDM) symbols in a downlink subframe; at least one of symbols in a gap between the downlink subframe and an uplink subframe; at least one of last p OFDM symbols in the uplink subframe; a SRS transmission window; a position of the DMRS in the uplink subframe; or a position of a last OFDM symbol of a first time slot in a subframe or a scheduling subframe, where k and p are positive integers; k and p are configured through a base station or predefined, and k and p comprise at least one of the followings: 1, 2, 3, 4 and 5.

In an exemplary embodiment, the transmitting the SRS when the LBT is executed successfully includes at least one of the followings: transmitting the SRS on a first available OFDM symbol after the LBT is executed successfully and a channel is acquired; transmitting the SRS on a last OFDM symbol of a subframe after the LBT is executed successfully and the channel is acquired; transmitting the SRS on a first OFDM symbol or j OFDM symbols after the LBT is executed successfully and the channel is acquired, where j is a positive integer; transmitting the SRS on a resource not beyond a symbol boundary after the LBT is executed successfully and the channel is acquired; or transmitting the SRS in a SRS transmission window after the LBT is executed successfully and the channel is acquired.

In an exemplary embodiment, the SRS transmission window is configured as follows: determining a starting position of the SRS transmission window by a time when the LBT is executed successfully or a set transmission window position; and a size of the SRS transmission window is set so that the SRS transmission window accommodates Q OFDM symbols or less than an integer multiple of OFDM symbols, where Q is a positive integer. The size of the SRS transmission window is determined through the following manners: configured by the base station, predefined, or configured through higher layer signaling In an exemplary embodiment, a frequency domain position where the processing unit transmits the SRS includes: an entire bandwidth on which the SRS is transmitted; or a specific SRS frequency domain pattern according to which the SRS is transmitted.

In an exemplary embodiment, the SRS transmission window and/or a SRS transmission position in the SRS transmission window may be determined by at least one of the followings: a starting position of the SRS transmission window, a size of the SRS transmission window, and intervals between SRS transmission positions in the SRS transmission window.

In an exemplary embodiment, the SRS transmission window and/or the SRS transmission position in the SRS transmission window and/or the SRS transmission position may be determined by one of the followings: configured through the base station, predefined, or notified through higher layer signaling.

In an exemplary embodiment, the processing unit is further configured to perform the following operations when both of the LBT execution position and the SRS transmission position are on a last OFDM symbol of a scheduling subframe: cause a process of transmitting the SRS and a process of executing the LBT to coexist on one symbol by means of frequency division; or cause the process of transmitting the SRS and the process of executing the LBT coexist on one symbol by means of time division In an exemplary embodiment, the processing unit is further configured to: transmit the SRS on the last OFDM symbol of the scheduling subframe, where a SRS frequency domain pattern is notified to the UE by a base station; and perform CCA detection on a last OFDM symbol of a subframe previous to the scheduling subframe, where a CCA pattern is notified to the UE by the base station, where a guard period is allowed to be reserved between a frequency domain resource corresponding to SRS transmission and a frequency domain resource corresponding to the CCA detection.

In an exemplary embodiment, the processing unit is further configured to receive a notification message transmitted by the base station before transmitting the SRS on the last OFDM symbol of the scheduling subframe and performing a CCA, where the notification message includes at least the following information: a time domain position where the SRS is transmitted by the UE, a SRS frequency domain pattern, an index number of a resource block without signal energy or a LBT execution pattern, and the LBT execution position.

In an exemplary embodiment, the processing unit is further configured to: perform the LBT execution process on part of resources of a last OFDM symbol of a subframe previous to the scheduling subframe; and if LBT is performed successfully on the part of the resources, transmit the SRS on remaining resources.

In an exemplary embodiment, the processing unit is further configured to perform one of the following operations when the LBT execution position is on a last OFDM symbol of a subframe previous to a scheduling subframe and the SRS transmission position is on a first OFDM symbol of the scheduling subframe: perform a corresponding LBT operation within a duration of one orthogonal frequency division multiplexing (OFDM) symbol; and transmit a reserved signal of a non-complete symbol, and transmit the SRS on the first OFDM symbol of the scheduling subframe according to a specific SRS frequency domain pattern or transmit the SRS on the first OFDM symbol of the scheduling subframe throughout the frequency domain bandwidth if a clear channel assessment (CCA) detection is performed successfully on the last OFDM symbol of the subframe previous to the scheduling subframe and a time when the CCA detection succeeds does not beyond a symbol boundary In an exemplary embodiment, the processing unit is further configured to perform one of the following operations when the LBT execution position is on last M orthogonal frequency division multiplexing (OFDM) symbols of a scheduling subframe: when symbols used for executing LBT successfully occupy only part of M symbols, transmit the SRS on remaining symbols of the M symbols or transmit the SRS with the remaining symbols as a SRS transmission window; when the symbols used for executing the LBT successfully occupy only the part of the M symbols, transmit a reserved signal on the remaining symbols of the M symbols and transmit the SRS on a configured SRS resource; or when all the M symbols are occupied during the LBT process for detecting channel idleness, transmit the SRS on the configured SRS resource, where the configured SRS resource is a configured first OFDM symbol after executing a LBT resource position or a configured last OFDM symbol of a next subframe of the LBT resource position or a configured SRS transmission window after the LBT resource position.

In an exemplary embodiment, the processing unit is further configured to perform one of the following operations if channel idleness is detected during an execution process of the LBT: transmitting a demodulation reference signal (DMRS) in a fourth orthogonal frequency division multiplexing (OFDM) symbol of a subframe instead of transmitting the SRS; multiplexing a DMRS resource to transmit the SRS; or transmitting the SRS in a position of a last symbol of a first time slot of the subframe.

In an exemplary embodiment, the dedicated indication signaling includes: an available state of various LBT functions and LBT parameters configured by a base station; or an available state of various LBT functions and LBT parameters configured by the UE.

In an exemplary embodiment, the various LBT functions include: having no contention back-off window; or having a fixed contention back-off window; or having a dynamic variable exponential back-off window.

In an exemplary embodiment, the LBT parameters include at least one of the following: a first CCA; or a second CCA, where a configured duration of the second CCA is less than a configured duration of the first CCA; or a defer period; or N, where N represents a back-off value and the value of N is predefined, configured by the base station or randomly generated.

In an exemplary embodiment, the processing unit is configured to perform the LBT according to the available state of the various LBT functions and the LBT parameters through the following modes: mode 1: performing first clear channel assessment (CCA) detection only once; mode 2: performing the first CCA detection for Y times, wherein Y is a positive integer greater than or equal to 2; mode 3: performing extended clear channel assessment (eCCA) detection; and mode 4: performing the first CCA detection and the eCCA detection.

In an exemplary embodiment, times Y of the first CCA detection in the mode 2 is determined by a duration of the first CCA detection and a number of symbols used for executing the LBT.

In an exemplary embodiment, the eCCA comprises W second CCA detection in the mode 3, where W is a positive integer; during a process of the eCCA, if the second CCA detects that a channel is busy, a defer period is entered, wherein if channel idleness is detected in the defer period, a value of N is reduced by a preset value progressively or is not reduced by the preset value progressively; the value of N is predefined, configured by the base station or randomly generated; and the preset value is configured by the base station or predefined; or during the process of the eCCA, if the second CCA detects that the channel is busy, a next second CCA detection is entered rather than entering the defer period.

In an exemplary embodiment, the processing unit is further configured to use criteria listed below to determine that the UE acquires a right to use an unlicensed carrier: criterion 1: if channel idleness is detected by the first CCA, the UE is determined to acquire the right to use the unlicensed carrier; criterion 2: if channel idleness is detected by one of a plurality of first CCAs, the UE is determined to acquire the right to use the unlicensed carrier; and criterion 3: if the value of N is reduced to 0 progressively, the UE is determined to acquire the right to use the unlicensed carrier.

Embodiments of the present disclosure further provide an information processing apparatus applied to a base station. The apparatus includes: a configuration unit configured to set configuration information; and a transmitting unit configured to transmit notification information carried with the configuration information to a UE, so that the UE acquires first information based on the notification information and performs contention-based access and transmits a SRS according to the first information, where the first information includes at least one of the followings: a frame structure, a LBT execution position, a SRS transmission position and dedicated indication signaling; and where the notification message includes at least the following information: a time domain position where the SRS is transmitted by the UE, a SRS frequency domain pattern, an index number of a resource block without signal energy or a LBT execution pattern, and the LBT execution position.

Embodiments of the present disclosure further provide an information processing system. The system includes the above information processing apparatus applied to the base station and the above information processing apparatus applied to the user equipment (UE).

Embodiments of the present disclosure further provide a storage medium. The storage medium is configured to store program codes for performing the following steps: acquiring first information; and performing contention-based access and transmitting a sounding reference signal (SRS) according to the first information, where the first information includes at least one of the followings: a frame structure, a listen-before-talk (LBT) execution position, a SRS transmission position and dedicated indication signaling.

Through embodiments of the present disclosure, first information is acquired; and contention-based access is performed and a SRS is transmitted according to the first information, where the first information includes at least one of the followings: a frame structure, a listen-before-talk (LBT) execution position, a SRS transmission position and dedicated indication signaling. This solves a collision problem that occurs when a LBT detection position and a SRS transmission position are both on a last OFDM symbol of a subframe, improving a probability that a UE accesses a channel and increasing SRS transmission opportunities.

BRIEF DESCRIPTION OF DRAWINGS

The accompanying drawings described herein are used to provide a further understanding of the present disclosure, and form a part of the present application. The schematic embodiments and descriptions thereof in the present disclosure are used to explain the present disclosure, and do not form improper limits to the present disclosure. In the accompanying drawings.

DETAILED DESCRIPTION

The present disclosure will be further described in detail with reference to the accompanying drawings and embodiments.

Embodiment 1

Figure 1:
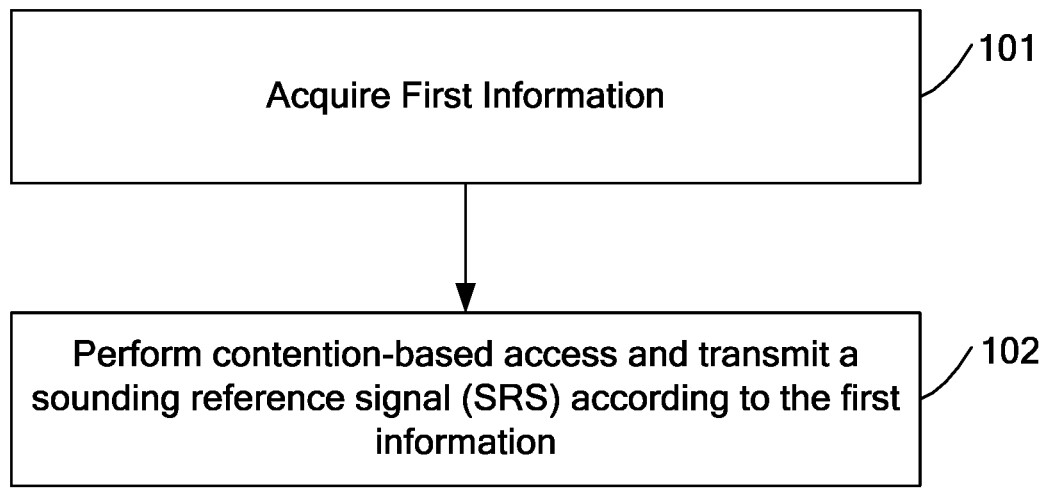
FIG. 1 is a flowchart of an information processing method according to an embodiment of the present disclosure.

FIG. 1 is a flowchart of an information processing method according to an embodiment of the present disclosure. The information processing method is applied to a UE. As illustrated in FIG. 1, the information processing method includes steps described below.

In step 101, first information is acquired.

The first information includes at least one of the followings: a frame structure, a LBT execution position, a SRS transmission position, dedicated indication signaling and the like.

Preferably, the first information may be acquired as follows.

The first information is acquired through predefined information.

Alternatively, the first information is acquired based on configuration of a base station or configuration of the UE.

Specifically, the frame structure may include: a pure uplink structure, a time division duplex (TDD) structure and a dynamic uplink/downlink configuration frame structure.

Herein, the pure uplink structure may be a frequency division duplex (FDD) frame structure that is all used for an uplink.

Specifically, the LBT execution position may include one of the followings: an uplink subframe, a special subframe or a downlink subframe.

Preferably, when the LBT execution position is in the uplink subframe, the LBT execution position includes one of the followings:

the last OFDM symbol in the uplink subframe;

last M OFDM symbols in the uplink subframe;

last M OFDM symbols in the uplink subframe and first L OFDM symbols in a next subframe; or all OFDM symbols in the uplink subframe.

M and L are positive integers, and M and L are configured through a base station or predefined.

Preferably, when the LBT execution position is in the special subframe, the LBT execution position includes one of the followings:

the last OFDM symbol of a guard period (GP) in the special subframe;

last M OFDM symbols of the GP in the special subframe;

last S OFDM symbols of the GP in the special subframe and t OFDM symbols in an uplink pilot time slot (UpPTS);

all OFDM symbols of the GP in the special subframe; or all OFDM symbols of the GP in the special subframe and symbols in the UpPTS.

S and t are positive integers, and S and t are configured through a base station or predefined.

Preferably, when the LBT execution position is in the downlink subframe, the LBT execution position includes one of the followings:

the last OFDM symbol in the downlink subframe;

a specific resource element (RE) on the last OFDM symbol in the downlink subframe; or a symbol occupied by a downlink pilot time slot (DwPTS) in the special subframe;

last M OFDM symbols of the DwPTS in the special subframe; or specific REs on OFDM symbols of the DwPTS in the special subframe.

Preferably, a SRS is transmitted by means of one of the following manners:

transmitting the SRS periodically;

transmitting the SRS aperiodically;

transmitting the SRS periodically and aperiodically;

transmitting the SRS when the LBT is executed successfully; or transmitting the SRS in a time domain position of a demodulation reference signal (DMRS).

Preferably, the transmitting the SRS periodically includes:

transmitting the SRS according to a current SRS transmission period; or transmitting the SRS after the current SRS transmission period is modified, e.g., the SRS transmission period is reduced to 1 ms.

Preferably, the transmitting the SRS aperiodically includes:

triggering aperiodic SRS transmission through downlink control information (DCI); or triggering aperiodic SRS transmission when the LBT is executed successfully.

Preferably, after the aperiodic SRS transmission is triggered, the SRS transmission position includes one of the followings: at least one of last k OFDM symbols in a downlink subframe; at least one of symbols in a gap between the downlink subframe and an uplink subframe; at least one of last p OFDM symbols in the uplink subframe; a SRS transmission window; a position of the DMRS in the uplink subframe; a position of a last OFDM symbol of a first time slot in a subframe or a scheduling subframe, where k and p are positive integers; k and p are configured through a base station or predefined; and k and p include at least one of the followings: 1, 2, 3, 4 and 5.

Preferably, the transmitting the SRS when the LBT is executed successfully includes one of the followings:

after the LBT is executed successfully and a channel is acquired, transmitting the SRS on a first available OFDM symbol, and it is not necessary to wait to transmit the SRS on a configured SRS resource;

transmitting the SRS on the last OFDM symbol of a subframe after the LBT is executed successfully and the channel is acquired;

transmitting the SRS on a first OFDM symbol or j OFDM symbols after the LBT is executed successfully and the channel is acquired, where j is a positive integer;

transmitting the SRS on a resource not beyond a symbol boundary after the LBT is executed successfully and the channel is acquired; or transmitting the SRS in a SRS transmission window after the LBT is executed successfully and the channel is acquired.

Preferably, the SRS transmission window and/or the SRS transmission position in the SRS transmission window may be determined by at least one of the followings: a starting position of the SRS transmission window, a size of the SRS transmission window, and intervals between SRS transmission positions in the SRS transmission window.

Preferably, the SRS transmission window and/or the SRS transmission position in the SRS transmission window and/or the SRS transmission position may be determined by one of the following manners: configured through the base station, predefined, or notified through higher layer signaling.

Preferably, the SRS transmission window may be configured as follows.

A starting position of the SRS transmission window is determined by a time when the LBT is executed successfully or a set transmission window position.

A size of the SRS transmission window accommodates Q OFDM symbols or less than an integer multiple of OFDM symbols, where Q is a positive integer.

The size of the SRS transmission window is determined through the following manners: configured by the base station, predefined, or configured through higher layer signaling.

Specifically, a frequency domain position of the SRS transmission position may include:

an entire frequency domain bandwidth on which the SRS is transmitted; or a specific SRS frequency domain pattern according to which the SRS is transmitted.

Preferably, the dedicated indication signaling may include:

an available state of various LBT functions and LBT parameters configured by a base station; or an available state of various LBT functions and LBT parameters configured by the UE.

The various LBT functions include at least one of the followings: having no contention back-off window; having a fixed contention back-off window; or having a dynamic variable exponential back-off window.

The LBT parameters include at least one of the followings: a first clear channel assessment (CCA), a second CCA, a defer period and N. N represents a back-off value and the value of N is predefined, set by the base station or randomly generated.

In step 102, contention-based access is performed and the SRS is transmitted according to the first information.

Preferably, when the LBT execution position is on the last OFDM symbol of a scheduling subframe and the SRS transmission position is also on the last OFDM symbol of the scheduling subframe, step 102 may be performed as follows:

a process of transmitting the SRS and a process of executing the LBT coexist on one symbol by means of frequency division; or a process of transmitting the SRS and a process of executing the LBT coexist on one symbol by means of time division.

Preferably, when the process of transmitting the SRS and the process of executing the LBT coexist on one symbol by means of frequency division, step 102 includes:

transmitting the SRS, by the UE, on the last OFDM symbol of the scheduling subframe, and notifying a SRS frequency domain pattern to the UE by a base station; and performing CCA detection, by the UE, on the last OFDM symbol of a subframe previous to the scheduling subframe, and notifying a CCA pattern to the UE by the base station.

A guard period is allowed to be reserved between a frequency domain resource corresponding to the process of transmitting the SRS and a frequency domain resource corresponding to the CCA detection.

Preferably, before the UE transmits the SRS on the last OFDM symbol of the scheduling subframe and performs the CCA, the method further includes:

receiving a notification message transmitted from the base station, where the notification message includes at least the following information: a time domain position where the SRS is transmitted by the UE, a SRS frequency domain pattern, an index number of a resource block without signal energy or a LBT execution pattern, and the LBT execution position.

Preferably, When the process of transmitting the SRS and the process of executing the LBT coexist on one symbol by means of time division, step 102 includes:

performing the LBT, by the UE, on part of resources of the last OFDM symbol of a subframe previous to the scheduling subframe; and transmitting the SRS, by the UE, on remaining resources if the UE performs the LBT successfully on the part of the resources.

Preferably, when the LBT execution position is on the last OFDM symbol of a subframe previous to the scheduling subframe and the SRS transmission position is on a first OFDM symbol of the scheduling subframe, step 102 is performed as follows:

The UE performs a corresponding LBT operation within a duration of one OFDM symbol.

If the UE performs CCA detection successfully on the last OFDM symbol of the subframe previous to the scheduling subframe and a time when the CCA detection succeeds does not beyond a symbol boundary, then a reserved signal of a non-complete symbol is transmitted, and the SRS is transmitted on the first OFDM symbol of the scheduling subframe according to a specific SRS frequency domain pattern or the SRS is transmitted throughout the frequency domain bandwidth.

Preferably, when the LBT execution position is on last M OFDM symbols of a scheduling subframe, the SRS is transmitted by means of one of the following manners:

when symbols used for executing the LBT successfully occupy only part of M symbols, transmitting the SRS on remaining symbols (i.e., symbols excluding the symbols used for executing the LBT) of the M symbols or transmitting the SRS with the remaining symbols as the SRS transmission window;

when the symbols used for executing the LBT successfully occupy only the part of the M symbols, transmitting a reserved signal on the remaining symbols (excluding the symbols used for executing the LBT) of the M symbols and transmitting the SRS on a configured SRS resource; or when all the M symbols are occupied during the LBT process for detecting channel idleness, transmitting the SRS on the configured SRS resource.

The configured SRS resource is a configured first OFDM symbol after executing a LBT resource position or a configured last OFDM symbol of a next subframe of the LBT resource position or a configured SRS transmission window after the LBT resource position.

Preferably, when channel idleness is detected during a process of the LBT, the method further includes one of the followings:

transmitting a demodulation reference signal (DMRS) in a fourth OFDM symbol of a subframe instead of transmitting the SRS;

multiplexing a DMRS resource to transmit the SRS; or transmitting the SRS in a position of a last symbol of a first time slot of the subframe.

Preferably, the UE executes a process of the LBT according to the available state of the various LBT functions and the LBT parameters through one the following modes:

Mode 1: performing the CCA detection (e.g., the first CCA detection) only once;

Mode 2: performing the CCA detection (e.g., the first CCA detection) for Y times, where Y is a positive integer greater than or equal to 2;

Mode 3: performing extended clear channel assessment (eCCA) detection; and

Mode 4: performing the first CCA detection and the eCCA detection.

Preferably, times Y of the first CCA detection in the mode 2 is determined by a duration of the first CCA detection and a number of symbols used for executing the LBT.

Preferably, the mode 3 is performed as follows:

The eCCA includes W second CCA detections, where W is a positive integer;

During an eCCA process, if a second CCA detects that a channel is busy, a defer period begins, where if channel idleness is detected in the defer period, a value of N is reduced by a preset value progressively or is not reduced by the preset value progressively; the value of N is predefined, configured by the base station or randomly generated; and the preset value is configured by the base station or predefined; or During the eCCA process, if the second CCA detects that the channel is busy, next second CCA detection is started rather than beginning the defer period.

Preferably, criteria for determining that the UE acquires a right to use an unlicensed carrier are described as follows:

Criterion 1: if channel idleness is detected by the first CCA, the UE is determined to acquire the right to use the unlicensed carrier;

Criterion 2: if channel idleness is detected by one of a plurality of first CCAs, the UE is determined to acquire the right to use the unlicensed carrier; and Criterion 3: if the value of N is reduced to 0 progressively, the UE is determined to acquire the right to use the unlicensed carrier.

Preferably, a predefined X-long time-domain resource before SRS transmission is configured to transmit CCA detection performed by the SRS.

Preferably, a CCA process corresponding to the periodic SRS transmission and a CCA process corresponding to the aperiodic SRS transmission are different. For example, an aperiodically transmitted SRS has a higher CCA detection priority than a periodically transmitted SRS. For example, only multiple CCA detections are performed or a shorter random back-off value N is configured or a threshold is reduced.

Preferably, if the CCA detection is not successful, the SRS may be transmitted using a short control signal. Alternatively, a transmission node continues performing CCA detection, performs CCA detection at intervals, or performs CCA detection at a next scheduled time.

Preferably, frequency domain intervals for SRS transmission may be adjusted from 2 to 3, 4, 6, 8 or 12.

Through the information processing method provided by this embodiment of the present disclosure, THE first information is acquired; and contention-based access is performed and a SRS is transmitted according to the first information, where the first information includes at least one of the followings: a frame structure, a LBT execution position, a SRS transmission position, dedicated indication signaling and the like. This solves a collision problem that occurs when the LBT detection position and the SRS transmission position are both on the last OFDM symbol of a subframe, improving a probability that a UE accesses a channel and increasing SRS transmission opportunities.

Correspondingly, the present disclosure further provides an information processing method applied to a base station. The method includes:

transmitting notification information to a UE, so that the UE acquires first information based on the notification information and performs contention-based access and transmits a SRS according to the first information.

The first information includes at least one of the followings: a frame structure, a LBT execution position, a SRS transmission position and dedicated indication signaling.

The notification message includes at least the following information: a time domain position where the SRS is transmitted by the UE, a SRS frequency domain pattern, an index number of a resource block without signal energy or a LBT execution pattern, and the LBT execution position.

This makes it easy for the UE to acquire the first information based on the notification information and to perform the contention-based access and transmit the SRS according to the first information, thus improving a probability that the UE accesses a channel and increasing SRS transmission opportunities.

Embodiment 2

Figure 2:
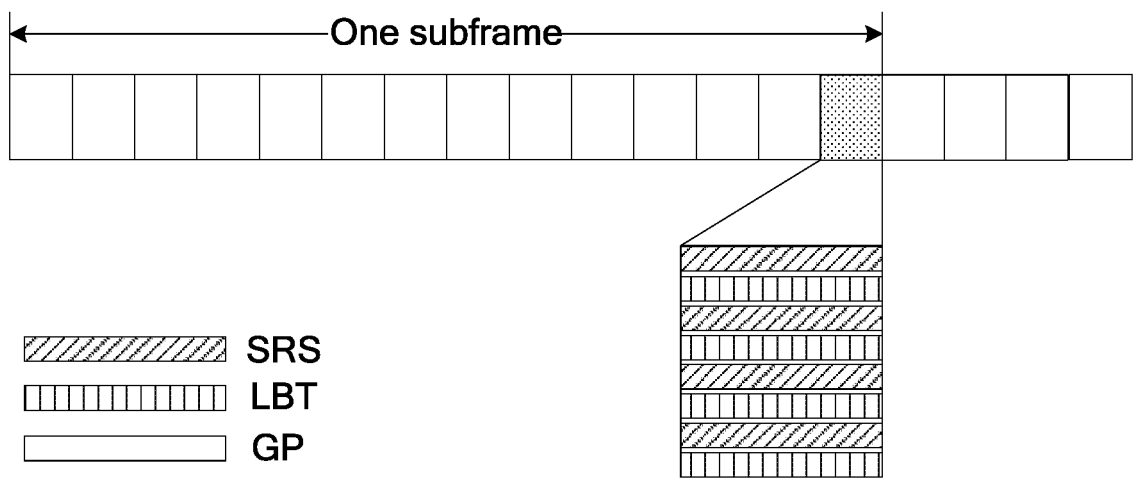
FIG. 2 is a schematic diagram illustrating coexistence of SRS and LBT in the same OFDM symbol by means of frequency division according to an embodiment of the present disclosure.

FIG. 2 is a schematic diagram illustrating coexistence of SRS and LBT in the same OFDM symbol by means of frequency division according to an embodiment of the present disclosure.

This embodiment describes a processing procedure of a UE when the LBT execution position and the SRS transmission position are both on the last OFDM symbol of a subframe. As illustrated in FIG. 2, when SRS and LBT are on the same OFDM symbol, a collision between SRS and LBT can be solved by means of frequency division.

Herein, it is assumed that two UEs (UE1 and UE2) are scheduled respectively in two consecutive subframes. For example, the UE1 is scheduled in an uplink subframe #1 and the UE2 is scheduled in an uplink subframe #2, and a position where each UE executes the LBT is on the last OFDM symbol of the uplink subframe (only 13 OFDM symbols in each subframe are used for data transmission). In this case, the SRS transmission position is also on the last symbol of the scheduling subframe. Specific processing is described as below.

First, a base station transmits a notification message to the UE. The notification message includes: a time domain position where the SRS is transmitted by the UE, a SRS frequency domain pattern, an index number of a resource block without signal energy or a LBT execution pattern, the LBT execution position and the like.

Next, UEs that have received the notification message from the base station detect channel busy/idle status at their respective LBT execution positions and transmit the SRS.

Specifically, in this embodiment, the UE1 learns from a base station to which the UE belongs that the position where the SRS is transmitted is on the last OFDM symbol of a scheduling subframe, and the frequency domain pattern is a position of a resource whose frequency domain resource index number is odd (or even). It is to be noted that the resource herein may be a subcarrier-level resource pattern or a resource-block-level (RB-level) resource pattern. The UE1 learns from the base station to which the UE1 belongs that the LBT execution position is on the last OFDM symbol of a subframe previous to the scheduling subframe and that the frequency domain pattern for LBT process is the position of the resource whose frequency domain resource index number is even (or odd) (the resource herein may be the subcarrier-level resource pattern or the RB-level resource pattern). Similarly, the UE2 learns information similar to information of the UE1 (i.e., learns the SRS transmission position and the specific LBT position) from a base station to which the UE2 belongs.

Based on the above learned information, the UE2 performs channel access detection of an unlicensed carrier on a frequency domain resource corresponding to the last OFDM symbol of a subframe previous to a scheduling subframe of the UE2 (i.e., the UE2 executes LBT detection on the specific frequency domain resource of the last OFDM symbol in the scheduling subframe of the UE1). While the UE2 performs a time-frequency-domain LBT process, the UE1 also transmits the SRS on the last symbol of the scheduling subframe of the UE1 in accordance with the learned SRS transmission pattern frequency domain position. Specifically, the UE2 or the UE1 may perform a UL LBT process within the last OFDM symbol by using one of the modes described below.

Mode 1: only one CCA (e.g., first CCA) detection is performed.

In other words, the first CCA detection is performed once on the last OFDM symbol in the subframe previous to the scheduling subframe of the UE in the following manners: in the frequency domain, the first CCA detection is performed according to resources the resource index numbers of which are even numbers, and in the time domain, the first CCA detection is performed for a duration of one OFDM symbol.

The duration of the first CCA detection may be set as 34 µs (the current default duration), 25 µs (PIFS duration), 20 µs, 18 µs, 16 µs (SIFS duration) or even 9 µs or 10 µs for one eCCA back-off. SIFS is an acronym for Short Interframe Space. PIFS is an acronym for Point Interframe Space.

Preferably, the duration of the first CCA detection is set as 25 µs, 20 µs or 18 µs (note: these durations are all greater than an ACK feedback duration (16 µs) in a Wi-Fi system, thus facilitating the fairness of coexistence of the Wi-Fi system and an LAA system).

A duration of 34 µs of the first CCA is used as an example. In this example, the duration of the first CCA is composed of a period of idle time (for receiving delay, MAC processing delay, etc.) and a plurality of detection durations (note: durations composing the duration of the first CCA can be flexibly adjusted within the total duration). Herein, one detection duration is composed of a receiving duration, a detection duration and a switching duration between transmitting and receiving. The receiving duration is used for receiving signal energy. The detection duration is used for detecting whether the received signal energy reaches a channel idleness threshold, so as to determine busy/idle status of the channel. The switching duration between transmitting and receiving is used for switching a device from a detection state to a receiving state or from the receiving state to the detection state. MAC is an acronym for media access control.

Furthermore, whether the CCA (e.g., first CCA) detection succeeds is determined in three cases described below.

Case 1: If channel busy status is detected at a time in a duration of 34 µs of the first CCA, e.g., between 18 µs and 27 µs, the first CCA detection is considered to be failure. Conversely, if channel idleness is detected throughout the duration of 34 µs, the first CCA detection is considered to be successful.

Case 2: If channel idleness is detected for only once in the duration of 34 µs of the first CCA, the first CCA is considered to detect channel idleness successfully.

Case 3: If channel busy status is detected at a time in the duration of 34 µs of the first CCA, e.g., between 18 µs and 27 µs, the detection can be continued until the channel enters idleness from busy status (the time at which the channel enters idleness from busy status is the beginning of the first CCA) and idleness lasts 34 µs. In this case, initial CCA detection of the device is considered to be successful. Note: The start time of the first CCA detection here is dynamic.

Mode 2: multiple CCA (e.g., first CCA) detections are performed.

Specifically, the mode 2 is similar to the mode 1, except that the UE can perform multiple CCA detections on the last OFDM symbol of the subframe previous to the scheduling subframe. The number of the first CCAs is related to the duration of the first CCA detection. That is, the number of the first CCAs is equal to a quotient obtained by dividing a configured duration for executing the LBT process by the duration of one CCA detection. For example, when the duration of the first CCA is 34 μs, the first CCA detection can be performed twice within one symbol.

Furthermore, whether the first CCA detection succeeds is determined in similar ways in the mode 1 and in the mode 2 except that, in the mode 2, if channel busy status is detected according to one of the three cases, next CCA detection can be performed. A starting position of the first CCA detection includes two types. One is that a position of the CCA detection is fixed each time. The other is that the position of the CCA detection is slidable each time (i.e., if channel busy status is detected at a specific time, then the starting position of the first CCA detection is slid to a time when the channel enters idleness from busy status and is calculated starting from this time).

Mode 3: An extended clear channel assessment (eCCA) process is performed directly.

The eCCA is composed of multiple second CCA detections.

The mode 3 is divided into two cases.

Case 1: If channel busy status is detected in the eCCA detection process, a defer period begins. In the case 1, two types of processing are provided.

Processing 1: During the defer period, a value of N is not reduced progressively when channel idleness is detected.

A duration of second CCA detection in the eCCA process is set to be 9 μs or 10 μs (by default for each company). If the second CCA detects channel busy status, then the device enters the defer period. A duration of the defer period may be 34 μs (corresponding to a defer period of a Wi-Fi system), 25 μs, 20 μs, 18 μs, 16 μs, 9 μs or 10 μs, or 0 μs (the defer period is set as 0). Note: The value of N is not reduced progressively even if channel idleness is detected in the defer period.

The value of N is randomly generated in a fixed window (in a duration of one symbol).

Similarly, the value of N may also be preset and not randomly generated. For example, the duration of one symbol is about 71 μs, and if the duration of the defer period is set as 0 and the duration of the second CCA detection is set as 9 μs or 10 μs, then the maximum value of N is 71 μs/9 μs=7. The value of N is selected from 0 to 7 and is set to be smaller as possible. Since the value of N is not reduced progressively in the defer period, the defer period is advised to be set to, but is not limited to, 0.

Processing 2: During the defer period, the back-off value can be randomly reduced progressively.

Different from the processing 1, if channel idleness is detected in the defer period, then the value of N is allowed to be reduced by a preset value progressively. The duration of the defer period may be 34 μs, 25 μs, 20 μs, 18 μs, 16 μs, 9 μs or 10 μs, or set as a multiple of a duration of a single eCCA detection. Number of channel detections may be determined according to the duration of the defer period and the duration of a single eCCA detection. For example, Q=duration of defer period/duration of a single eCCA detection.

Herein, the duration of the single eCCA detection may be the same as or different from the duration of the second CCA detection during eCCA back-off. If channel idleness is detected during the defer period or N is reduced to 0 progressively during the defer period, the device is considered to have access to an unlicensed carrier.

Case 2: If channel busy status is detected during the eCCA detection process, the defer period does not begin.

In the case 2, the eCCA process is directly simplified to multiple random back-offs in one symbol time. That is, the duration of the second CCA detection is set to be 9 μs or 10 μs (by default for each company). The maximum value of N may be calculated from the duration of one symbol and the duration of the second CCA detection (i.e., duration of one symbol/duration of second CCA detection=maximum value of N). According to the formula, the maximum value of N can be 7. If 4 is randomly generated as the value of N or the value of N is preconfigured as 4, then the device is considered to have access to the unlicensed carrier successfully after contention if the value of N can be reduced to 0 progressively within one symbol. If channel idleness is detected for once, then N can be reduced by the preset value progressively. Normally, the preset value is 1.

Mode 4: The first CCA detection process and the eCCA detection process are performed.

The duration of the first CCA is the same as that in the mode 1, but a shorter duration needs to be selected as possible, e.g., 25 μs (PIFS duration) (46 μs as remaining duration of one symbol), 20 μs (51 μs as remaining duration of one symbol), 18 μs (53 μs as remaining duration of one symbol), 16 μs (55 μs as remaining duration of one symbol) or even 9 μs or 10 μs as one eCCA back-off (62 μs as remaining duration of one symbol). The eCCA process is the same as the mode 3. The duration of the first CCA can be selected from the above and random back-off is adopted. Preferably, the duration of the first CCA is set as 16 μs, and the back-off value of N is randomly generated from [0, 3]. Different values of N are set according to different durations of the first CCA. When channel busy status is detected, optionally, the duration of the defer period is set as 0, or when channel idleness is detected during the defer period, the value of N can be reduced by the preset value progressively.

Based on the above four modes, criteria for determining that the UE acquires a right to use the unlicensed carrier are described as follows:

Criterion 1: If channel idleness is detected by a first CCA, it is determined that the UE acquires the right to use the unlicensed carrier;

Criterion 2: If channel idleness is detected by one of a plurality of first CCAs, it is determined that the UE acquires the right to use the unlicensed carrier; and Criterion 3: If the value of N is reduced to 0 progressively, it is determined that the UE acquires the right to use the unlicensed carrier.

Furthermore, if the LBT success time does not beyond the symbol boundary, a reserved signal of a non-complete symbol is transmitted in the remaining of the symbol.

The reserved signal may be a preamble, a primary synchronization signal (PSS)/a secondary synchronization signal (SSS), a preset signal and the like. The reserved signal may be applicable to signals recognized by another UE.

Embodiment 3

Figure 3:
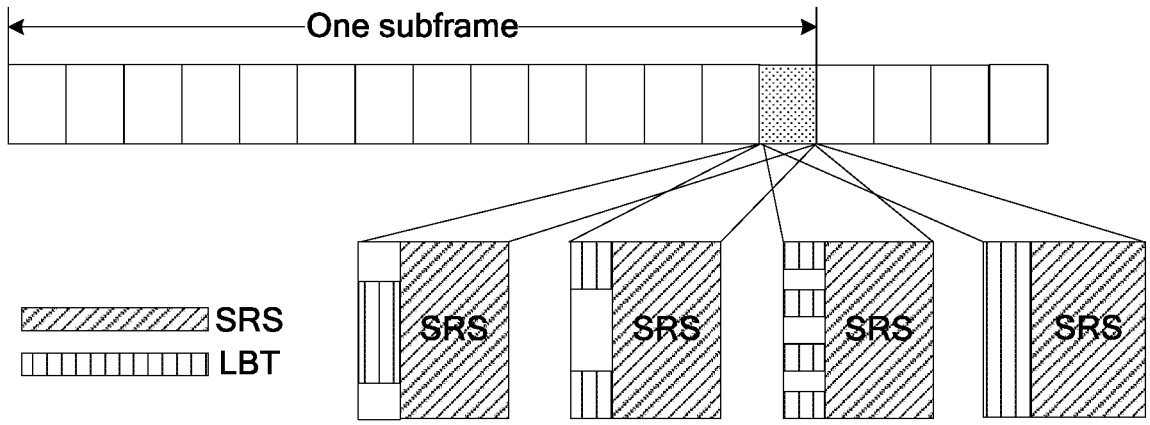
FIG. 3 is a schematic diagram illustrating that SRS and LBT coexists in the same OFDM symbol by means of time division according to an embodiment of the present disclosure.

FIG. 3 is a schematic diagram illustrating that SRS and LBT coexists in the same OFDM symbol by means of time division according to an embodiment of the present disclosure.

This embodiment describes a processing procedure of a UE when the LBT execution position and the SRS transmission position are both on the last OFDM symbol of a subframe. As illustrated in FIG. 3, when SRS and LBT are on the same OFDM symbol, a collision between SRS and LBT can be solved by means of time division. Within this symbol, the UE needs to complete a channel access operation and needs to transmit its own SRS on remaining resources. That is, whether the SRS can be successfully transmitted depends on the LBT process and configured or set parameters. Therefore, in this embodiment, a preferred LBT process is described as follows:

Mode 1: Only one CCA (e.g., first CCA) detection is performed. This mode is the same as the LBT mode 1 in the embodiment 2.

Mode 2: Multiple CCA (e.g., first CCA) detections are performed. Different from the LBT mode 2 in the embodiment 2, in this mode, if the duration of one first CCA is 34 μs, then only one first CCA can be performed on one symbol. In this way, if the first CCA detection fails, the SRS cannot be transmitted. Therefore, a relatively short duration of the first CCA needs to be selected. For example, 18 μs is selected. In this case, the number of the first CCAs can be set as twice, and the sum of multiple CCA detection durations cannot exceed about one half of one symbol duration. Since the SRS energy is mainly concentrated in the middle of 30 μs or 40 μs, the remaining duration for SRS transmission cannot be less than 30 μs or 40 μs; otherwise, inaccurate detected channel conditions occur.

Mode 3: A short eCCA process is performed directly. Different from the LBT mode 3 in the embodiment 2, in this mode, the maximum value of N can only be a positive integer less than four. Preferably, the duration of the defer period is set as 0, or when channel idleness is detected during the defer period, the value of N can be reduced by the preset value progressively. This helps the UE access a channel as soon as possible so that the SRS is transmitted within the remaining part of the symbol.

The mode 4 in the embodiment 2 may also be used in the LBT channel access process in this embodiment, but a shorter duration of the first CCA needs to be selected, and a smallest possible number needs to be selected as a random back-off value of N, or the mode 4 is equivalent to defer period+eCCA process.

For such case in this embodiment, the UE needs to access the channel as fast as possible, and the remaining resources are used for transmitting the SRS. At this point, only one truncated SRS sequence can be transmitted on the remaining resources.

Furthermore, as illustrated in FIG. 3, a frequency domain pattern used in the CCA detection may be a full-bandwidth or narrow-bandwidth frequency domain pattern, resources corresponding to both ends of a detection frequency domain (i.e., energy is concentrated on resources at both ends of the frequency domain), or resources in the middle of the frequency domain (i.e., the energy is concentrated on resources in the middle of the frequency domain).

Embodiment 4

Figure 4:
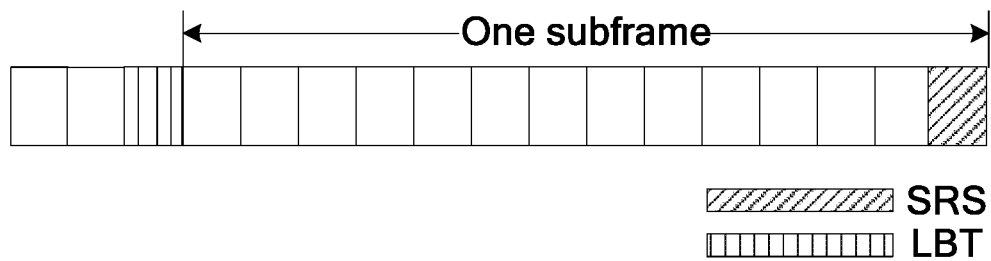
FIG. 4 is a schematic diagram illustrating that each of a LBT position and a SRS position is on a respective one of last OFDM symbols of adjacent subframes according to an embodiment of the present disclosure.

FIG. 4 is a schematic diagram illustrating that each of a LBT position and a SRS position is on a respective one of last OFDM symbols of adjacent subframes according to an embodiment of the present disclosure.

In this embodiment, a position where the UE executes the LBT is on the last OFDM symbol of a subframe previous to a scheduling subframe, and the SRS is transmitted on the last OFDM symbol of the scheduling subframe. Therefore, whether UE-side data and the SRS can be successfully transmitted depends on execution of the LBT within one OFDM symbol.

Therefore, it is necessary to provide a LBT mode that allows as many channel access opportunities as possible. Specifically, a feasible LBT process is as described below.

The LBT execution mode may adopt one of the four LBT modes described in the embodiment 2. Different from the embodiment 2 where the LBT is performed according to a specific frequency domain pattern to detect a channel, in this embodiment, the LBT process may perform detection on a frequency domain resource corresponding to a specific pattern in a frequency domain or may perform CCA detection on a frequency domain resource corresponding to a full bandwidth.

In this embodiment, a SRS transmission mode is performed without changing an original SRS transmission position, thus not affecting standardization.

Furthermore, if the LBT of the UE in a next subframe exists in the SRS transmission position, the priority of the LBT execution should be higher than that of SRS transmission or the method of the embodiment 2 or 3 may be used.

Embodiment 5

Figure 5:
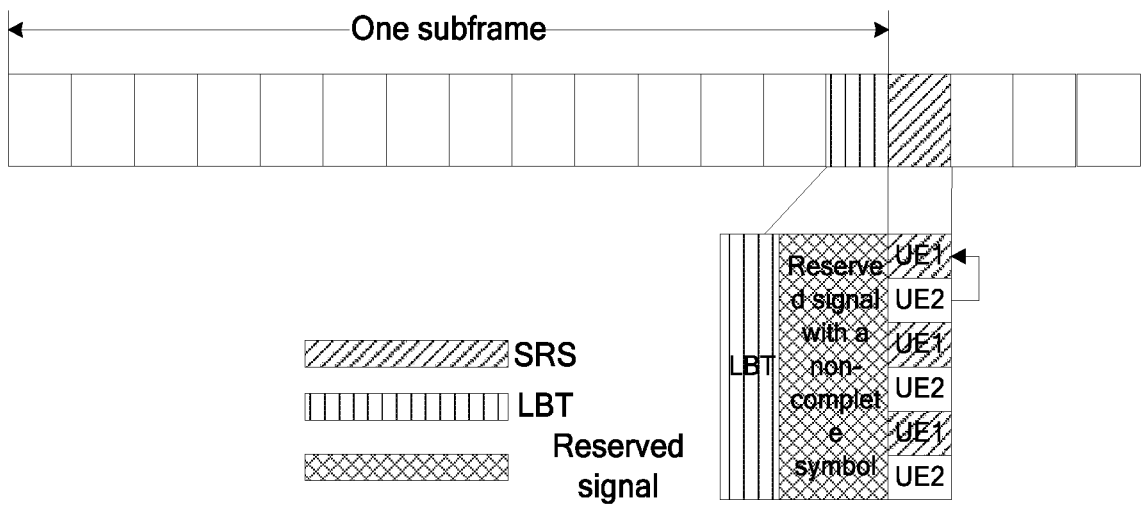
FIG. 5 is a schematic diagram illustrating that a LBT execution position is on a last OFDM symbol of a subframe and a SRS position is on a first OFDM symbol of a next subframe according to an embodiment of the present disclosure.

FIG. 5 is a schematic diagram illustrating that a LBT execution position is on the last OFDM symbol of a subframe and a SRS position is on a first OFDM symbol of a next subframe according to an embodiment of the present disclosure.

This embodiment describes a situation where the SRS is transmitted on a first OFDM symbol of a scheduling subframe. The LBT execution position is still on the last OFDM symbol of the subframe previous to the scheduling subframe of the UE. Similarly, the LBT execution is as described in the embodiment 4.

Contention-based access to an unlicensed carrier is performed using one of the four LBT modes described in the embodiment 2. If a time when channel idleness is detected does not beyond a subframe boundary, the UE needs to transmit a reserved signal of a non-complete symbol to occupy a channel to prevent other nodes from preempting the channel. In this case, the transmitted reserved signal may be a preamble, a PSS/SSS, a preset signal or another signal that can be used for recognition of other UEs. In addition, the reserved signal may be transmitted on a full bandwidth or according to a specific frequency domain pattern. Similarly, in the frequency domain, CCA detection may also be performed according to a specific frequency domain pattern or on a full bandwidth to determine whether the channel is idle, so as to access the unlicensed carrier.

Furthermore, UEs capable of recognizing reserved signals transmit their respective SRS on the first OFDM symbol of the next subframe. Each UE may transmit a SRS on one symbol by means of time division, frequency division and code division. This helps a base station to which the UEs belong perform channel measurement in advance.

Embodiment 6

Figure 6:
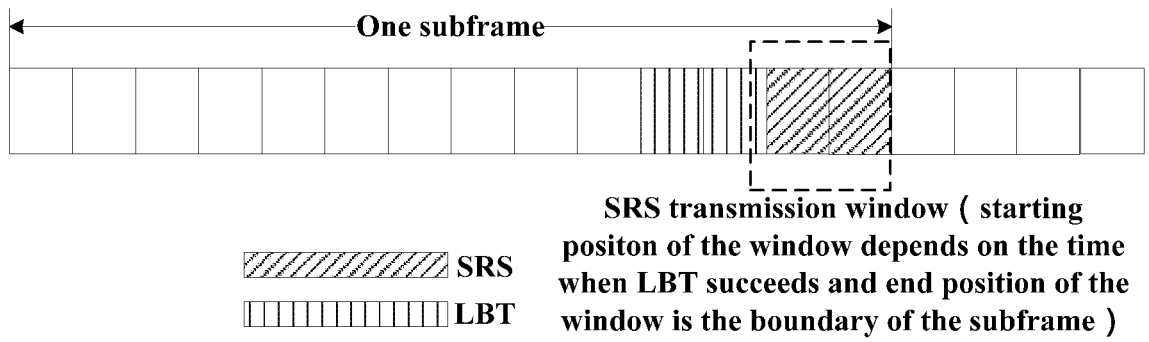
FIG. 6 is a schematic diagram illustrating that a LBT execution position is on last several OFDM symbols of a subframe and an end of a SRS transmission window is at a subframe boundary according to an embodiment of the present disclosure.

FIG. 6 is a schematic diagram illustrating that a LBT execution position is on last several OFDM symbols of a subframe and an end of a SRS transmission window is at a subframe boundary according to an embodiment of the present disclosure.

Specifically, in this embodiment, it is assumed that symbols allocated to a UE for LBT execution are last 4 OFDM symbols of a subframe previous to a scheduling subframe, and a mode in which the UE executes LBT may be performed according to one of the four modes described in the embodiment 2. To enable the UE to access a channel at a high probability, here a LBT process with a first CCA plus random back-off is used as an example to illustrate a LBT process and a SRS transmission process in a SRS transmission window. Assume that LBT parameters configured for the UE by a base station are as follows:

A duration of a first CCA detection is 34 µs. A defer period is 34 µs. A duration of a second CCA detection is 9 µs. A function of progressive decrease is enabled in the defer period. A value of N is 5. If N is generated randomly, N needs to be generated within a fixed window length of a 2-symbol time and needs to be as small as possible. The LBT process is performed according to the above parameters within 4 OFDM symbols. A duration of 4 OFDM symbols is about 284 µs.

In step 1, a UE1 performs the first CCA detection. If channel idleness is detected by the first CCA, it is considered that the UE has access to an unlicensed carrier after contention. In this case, a reserved signal of a non-complete symbol is transmitted on remaining resources in a fourth last symbol, a starting position of the SRS transmission window is on an antepenultimate symbol, and the UE transmits its own SRS on the antepenultimate symbol. The UE may transmit the SRS according to a specific frequency domain pattern. This step has the advantage that other UEs in the same cell can recognize the pattern while continuing CCA detection so that the UEs can transmit their respective SRSs in the SRS transmission window and thus can multiplex contended resources. Otherwise, if the first CCA detection fails, the process goes to step 2.

In step 2, if the UE detects channel busy status, the defer period begins. If the UE detects channel idleness in the defer period, a value of N can be reduced by a preset value progressively. For example, if the UE detects channel idleness in the defer period, the value of N is reduced by 4 progressively. At this point, the value of N is 1.

In step 3, an eCCA process is started. If the second CCA detects channel idleness, N is reduced by 1 progressively. Otherwise, if channel busy status is detected, the UE goes to step 2. This proceeds until N is reduced to 0 progressively.

If a time when the UE successfully acquires the unlicensed resource after contention is on a penultimate symbol of the subframe after the steps 1 through 3 are performed, then a size of the SRS transmission window is the last OFDM symbol, or from a time when LBT execution succeeds to the subframe boundary, or available resources after LBT execution succeeds. In the same way, the SRS may be transmitted according to a specific frequency domain pattern, making it easy for multiplexing UEs to perform recognition and multiplex contended resources to transmit data.

If multiple UEs simultaneously detect channel idleness, then multiple UEs that successfully acquire channels after contention in the SRS transmission window may transmit their respective SRSs simultaneously in the transmission window by means of frequency division, time division or code division.

Note: SRSs are transmitted on frequency domain resources other than physical uplink control channel (PUCCH) resources. That is, SRSs are transmitted by multiplexing physical uplink shared channel (PMSCH) resources.

Embodiment 7

Figure 7:
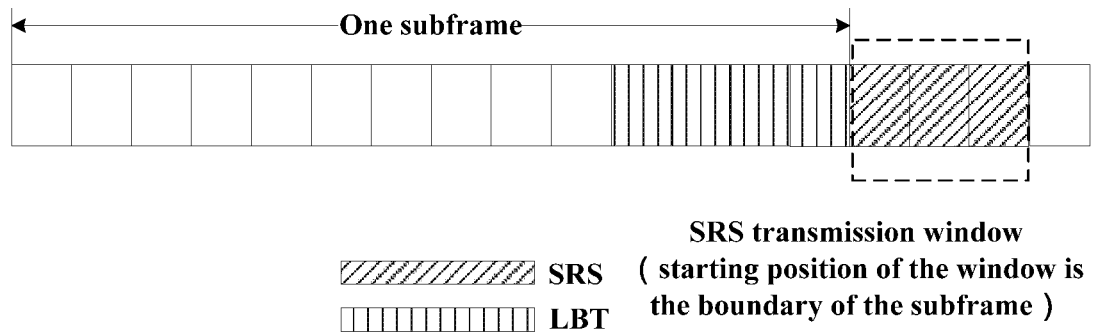
FIG. 7 is a schematic diagram illustrating that a LBT execution position is on last several OFDM symbols of a subframe and a start of a SRS transmission window is at a beginning of the subframe according to an embodiment of the present disclosure.

FIG. 7 is a schematic diagram illustrating that a LBT execution position is on last several OFDM symbols of a subframe and a start of a SRS transmission window is at a beginning of the subframe according to an embodiment of the present disclosure.

Specifically, in this embodiment, it is assumed that symbols allocated to a UE for LBT execution are the last 4 OFDM symbols of a subframe previous to a scheduling subframe. The UE may execute LBT by using one of the mode 3 and the mode 4 (i.e., LBT mode with random back-off) in the embodiment 2 to perform contention-based access. For details about a LBT process, see the embodiment 2.

In a case where a time when a CCA detects channel idleness does not beyond a subframe boundary, the UE may transmit a reserved signal of a non-complete symbol and or a reserved signal of a complete symbol. The reserved signal may be transmitted on a full bandwidth or according to a specific frequency domain pattern. Furthermore, the reserved signal may be a preamble, a PSS/SSS or the like. Preferably, transmitting the reserved signal according to the specific frequency domain pattern makes it easy for other UEs in the same cell to perform recognition, so that the UEs transmit their respective SRSs in a SRS transmission window of a next subframe. Alternatively, the reserved signal may also be transmitted on the full bandwidth. In this case, the reserved signal may carry cell ID information, group ID information and other information used by other UEs to perform recognition.

Furthermore, if the time when the CCA detects channel idleness is just at the subframe boundary, then UEs succeeding in contention can transmit their respective SRSs in the configured SRS transmission window. Preferably, the SRS transmission window is one OFDM symbol, and the SRS transmission window may be one subframe (i.e., a first subframe after the LBT position) at most. It can be seen from FIG. 7 that, in this embodiment, the SRS is transmitted on first three OFDM symbols of the subframe. A size and a position of the SRS transmission window may be configured by a base station or predefined.

Note: SRSs are transmitted on frequency domain resources other than PUCCH resources. That is, SRSs are transmitted by multiplexing PMSCH resources.

Furthermore, if the UE fails to execute LBT on a given symbol or a value of N is not reduced to 0 progressively on a specified LBT execution position, the following operations may be performed:

On the one hand, the current N value of the UE may be frozen. On the other hand, the UE continues executing the LBT process until N is reduced to 0. This amounts to postponing a starting position on which the SRS and/or data is transmitted.

Another special example is that if the LBT execution position of the UE is on a last OFDM symbol in a downlink subframe or on some specific REs, then the LBT process can still use one of the LBT modes with or without random back-off in the embodiment 2. The SRS may be transmitted in a uplink-downlink conversion time, in a GP of a special subframe, or in an UpPTS, or on a last or first OFDM symbol of an uplink subframe.

Another special example is that the size of the SRS transmission window is a fixed value and a time when LBT execution succeeds does not reach the subframe boundary. In this case, a starting position of the SRS transmission window is at the time when LBT execution succeeds, and the SRS is transmitted within a fixed SRS transmission window length. The SRS may also be transmitted according to a specific frequency domain pattern, making it easy for multiplexing UEs to perform recognition and multiplex contended resources to transmit data. At this point, the starting position on which the data is transmitted may not be at the subframe boundary.

Embodiment 8

Figure 8:
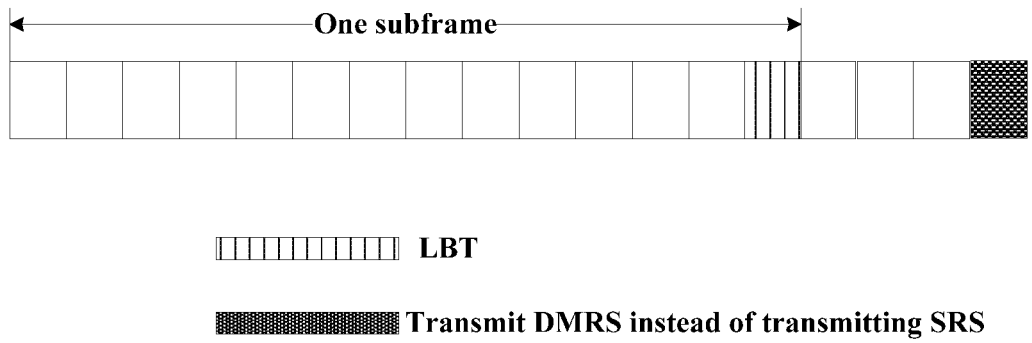
FIG. 8 is a schematic diagram illustrating that a LBT execution position is on a last OFDM symbol of a subframe and a SRS is transmitted on a transmission symbol of a DMRS according to an embodiment of the present disclosure.

FIG. 8 is a schematic diagram illustrating that a LBT execution position is on a last OFDM symbol of a subframe and a DMRS is transmitted on a DMRS transmission position to replace a SRS function according to an embodiment of the present disclosure. DMRS is an acronym for demodulation reference signal.

For this embodiment, the LBT execution position is on the last OFDM symbol of a scheduling subframe, and the LBT mode may be the same as that in the embodiment 2. A SRS may be replaced with a DMRS signal, because the DMRS also has a channel measurement capability and the channel measurement capability of the DMRS is more accurate than that of the SRS. Therefore, in order for a base station to advance base station channel measurement, the DMRS may be transmitted on a fourth symbol of a PMSCH resource to replace the SRS; or the SRS may also be transmitted at a position of the DMRS; or the SRS may be transmitted on a last OFDM symbol of a first time slot of the scheduling subframe.

From the description of the embodiments described above, it will be apparent to those skilled in the art that the method of any embodiment described above may be implemented by means of software plus a necessary general-purpose hardware platform, or may of course be implemented by hardware, but in many cases, the former is a preferred embodiment. Based on this understanding, the solutions provided by the present disclosure substantially, or the part contributing to the related art, may be embodied in the form of a software product. The software product is stored on a storage medium (such as a ROM/RAM, a magnetic disk or an optical disk) and includes several instructions for enabling a terminal device (which may be a mobile phone, a computer, a server or a network device) to execute the method according to each embodiment of the present disclosure.

Embodiment 9

This embodiment provides an information processing apparatus for implementing the above-mentioned embodiments and preferred examples. What has been described will not be repeated. As used below, the term "unit" may be software, hardware or a combination thereof capable of implementing preset functions. The apparatus in the embodiment described below is preferably implemented by software, but implementation by hardware or by a combination of software and hardware is also possible and conceived.

Figure 9:
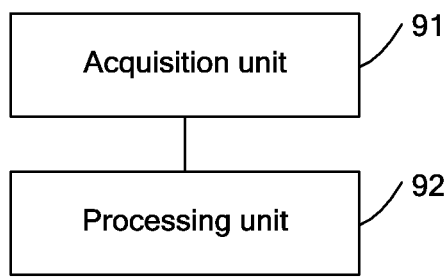
FIG. 9 is a structure diagram of an information processing apparatus according to an embodiment of the present disclosure.

FIG. 9 is a structure diagram of an information processing apparatus according to an embodiment of the present disclosure. As illustrated in FIG. 9, the information processing apparatus includes:

an acquisition unit 91 configured to acquire first information; and a processing unit 92 configured to perform contention-based access and transmit a SRS according to the first information.

The first information includes at least one of the followings: a frame structure, a LBT execution position, a SRS transmission position and dedicated indication signaling.

Preferably, the acquisition unit 91 is further configured to acquire the first information through one of the following manners:

acquiring the first information through predefined information;

acquiring the first information based on configuration of a base station; or acquiring the first information based on configuration of a UE.

Preferably, the frame structure includes: a FDD frame structure, a TDD structure and a dynamic uplink/downlink configuration frame structure which are all applied to an uplink.

Preferably, the LBT execution position includes one of the followings: an uplink subframe; a special subframe; or a downlink subframe.

Preferably, when the LBT execution position is in the uplink subframe, a position where the processing unit executes LBT includes one of the followings:

the last OFDM symbol in the uplink subframe;

last M OFDM symbols in the uplink subframe;

last M OFDM symbols in the uplink subframe and first L OFDM symbols in a next subframe; or all OFDM symbols in the uplink subframe.

M and L are positive integers; and M and L are configured through a base station or predefined.

Preferably, when the LBT execution position is in the special subframe, a position where the processing unit executes LBT includes one of the followings:

the last OFDM symbol of the GP in the special subframe;

last S OFDM symbols of the GP in the special subframe;

last S OFDM symbols of the GP in the special subframe and t OFDM symbols in an UpPTS;

all OFDM symbols of the GP in the special subframe; or all OFDM symbols of the GP in the special subframe and symbols in the UpPTS.

S and t are positive integers; and S and t are configured through a base station or predefined.

Preferably, when the LBT execution position is in the downlink subframe, a position where the processing unit executes LBT includes one of the followings:

the last OFDM symbol in the downlink subframe;

specific RE on the last OFDM symbol in the downlink subframe;

a symbol occupied by a DwPTS in the special subframe;

last M OFDM symbols of the DwPTS in the special subframe; or specific REs on OFDM symbols of the DwPTS in the special subframe.

Preferably, the processing unit 92 is configured to transmit the SRS through one of the following manners:

transmitting the SRS periodically;

transmitting the SRS aperiodically;

transmitting the SRS periodically and aperiodically;

transmitting the SRS when the LBT is executed successfully; or transmitting the SRS in a time domain position of a DMRS.

Preferably, the transmitting the SRS periodically includes:

transmitting the SRS according to a current SRS transmission period; or transmitting the SRS after the current SRS transmission period is modified, e.g., reduced to 1 ms.

Preferably, the transmitting the SRS aperiodically includes:

triggering aperiodic SRS transmission through DCI; or triggering aperiodic SRS transmission when the LBT is executed successfully.

Preferably, after the aperiodic SRS transmission is triggered, the SRS transmission position includes: at least one of last k OFDM symbols in a downlink subframe; or at least one of symbols in a gap between the downlink subframe and an uplink subframe; or at least one of last p OFDM symbols in the uplink subframe; or a SRS transmission window; or a position of the DMRS in the uplink subframe; or a position of a last OFDM symbol of a first time slot in a subframe or a scheduling subframe, where k and p are positive integers; k and p are configured through a base station or predefined; and k and p include at least one of the followings: 1, 2, 3, 4 and 5.

Preferably, the transmitting the SRS when the LBT is executed successfully includes one of the followings:

after the LBT is executed successfully and a channel is acquired, transmitting the SRS on a first available OFDM symbol, and it is not necessary to wait to transmit the SRS on a configured SRS resource;

transmitting the SRS on the last OFDM symbol of a subframe after the LBT is executed successfully and the channel is acquired;

transmitting the SRS on a first OFDM symbol or j OFDM symbols after the LBT is executed successfully and the channel is acquired, where j is a positive integer;

transmitting the SRS on a resource not beyond a symbol boundary after the LBT is executed successfully and the channel is acquired; or transmitting the SRS in a SRS transmission window after the LBT is executed successfully and the channel is acquired.

Preferably, the SRS transmission window and/or a SRS transmission position in the SRS transmission window may be determined by at least one of the followings: a starting position of the SRS transmission window, a size of the SRS transmission window, and intervals between SRS transmission positions in the SRS transmission window.

Preferably, the SRS transmission window and/or the SRS transmission position in the SRS transmission window and/or the SRS transmission position may be determined by one of the followings: configured through the base station, predefined, or notified through higher layer signaling.

Preferably, the SRS transmission window may be configured as follows:

a starting position of the SRS transmission window is determined by a time when the LBT execution succeeds or a configured transmission window position; and a size of the SRS transmission window accommodates Q OFDM symbols or less than an integer multiple of OFDM symbols, where Q is a positive integer.

The size of the SRS transmission window is determined through one of the follows manners: configured by the base station, predefined, or configured through higher layer signaling.

Preferably, a frequency domain position where the processing unit 92 transmits the SRS includes:

an entire bandwidth on which the SRS is transmitted; or a specific SRS frequency domain pattern according to which the SRS is transmitted.

Preferably, the processing unit 92 is further configured to perform the following operations when the LBT execution position is on the last OFDM symbol of a scheduling subframe and the SRS transmission position is also on the last OFDM symbol of the scheduling subframe:

cause a process of transmitting the SRS and a process of executing the LBT to coexist on one symbol by means of frequency division; or cause the process of transmitting the SRS and the process of executing the LBT to coexist on one symbol by means of time division.

Preferably, the processing unit 92 is further configured to:

transmit the SRS on the last OFDM symbol of the scheduling subframe, wherein a SRS frequency domain pattern is notified to the UE by a base station; and perform channel busy/idle status detection on the last OFDM symbol of a subframe previous to the scheduling subframe, wherein a CCA pattern is notified to the UE by the base station.

A guard period is allowed to be reserved between a frequency domain resource corresponding to SRS transmission and a frequency domain resource corresponding to the CCA detection.

Preferably, the processing unit 92 is further configured to receive a notification message transmitted by the base station before the SRS is transmitted on the last OFDM symbol of the scheduling subframe and the CCA is performed. The notification message includes at least the following information: a time domain position where the SRS is transmitted by the UE, a SRS frequency domain pattern, an index number of a resource block without signal energy or a LBT execution pattern, and the LBT execution position.

Preferably, the processing unit 92 is further configured to:

perform the LBT on part of resources of the last OFDM symbol of a subframe previous to the scheduling subframe; and transmit the SRS on remaining resources if the LBT is performed successfully on the part of the resources.

Preferably, the processing unit 92 is further configured to perform the following operations when the LBT execution position is on the last OFDM symbol of a subframe previous to a scheduling subframe and the SRS transmission position is on a first OFDM symbol of the scheduling subframe:

performing a corresponding LBT operation within a duration of one OFDM symbol; and transmitting a reserved signal of a non-complete symbol, and transmitting the SRS on the first OFDM symbol of the scheduling subframe according to a specific SRS frequency domain pattern or transmitting the SRS on an entire frequency domain bandwidth, if the CCA detection is performed successfully on the last OFDM symbol of the subframe previous to the scheduling subframe and a time when the CCA detection succeeds does not beyond a symbol boundary.

Preferably, the processing unit 92 is further configured to performing the following operations when the LBT execution position is on last M OFDM symbols of a scheduling subframe:

when symbols used for executing LBT successfully occupy only part of M symbols, transmitting the SRS on remaining symbols (excluding the symbols used for executing the LBT) of the M symbols or transmitting the SRS with the remaining symbols as a SRS transmission window; or when the symbols used for executing the LBT successfully occupy only the part of the M symbols, transmitting a reserved signal on the remaining symbols (excluding the symbols used for executing the LBT) of the M symbols or transmitting the SRS on a configured SRS resource; or transmitting the SRS on the configured SRS resource if all the M symbols are occupied by the LBT for detecting channel idleness.

The configured SRS resource may be a configured first OFDM symbol after a LBT execution resource position or a configured last OFDM symbol of a next subframe of a LBT resource position or a configured SRS transmission window after the LBT resource position.

Preferably, the processing unit 92 is further configured to perform one of the following operations when channel idleness is detected by the LBT:

transmitting a DMRS on a fourth OFDM symbol of a subframe instead of transmitting the SRS;

multiplexing a DMRS resource to transmit the SRS; or transmitting the SRS at a position of a last symbol of a first time slot of the subframe.

Preferably, the dedicated indication signaling may include:

an available state of various LBT functions and LBT parameters configured by a base station; or an available state of various LBT functions and LBT parameters configured by the UE.

The various LBT functions include one of the followings: having no contention back-off window; having a fixed contention back-off window; or having a dynamic variable exponential back-off window.

The LBT parameters include at least one of the followings: a first CCA, a second CCA, a defer period and N. A value of N is predefined or randomly generated.

Preferably, the processing unit 92 executes the LBT process according to the available state of the various LBT functions and the LBT parameters as follows:

Mode 1: the first CCA detection is performed only once;

Mode 2: the first CCA detection is performed for Y times, where Y is a positive integer greater than or equal to 2;

Mode 3: the eCCA detection is performed;

Mode 4: the first CCA detection and the eCCA detection are performed.

Preferably, times Y of the first CCA detection in the mode 2 is determined by a duration of the first CCA detection and a number of symbols used for executing the LBT.

Preferably, the mode 3 is performed as follows:

The eCCA includes W second CCA detection, where W is a positive integer;

During an eCCA process, if a second CCA detects that a channel is busy, a defer period begins, where if channel idleness is detected in the defer period, a value of N is reduced by a preset value progressively or is not reduced by the preset value progressively; the value of N is predefined, configured by the base station or randomly generated; and the preset value is configured by the base station or predefined; or During the eCCA process, if the second CCA detects that the channel is busy, the defer period does not begin and next second CCA detection is started.

Preferably, the processing unit 92 is further configured to use criteria listed below to determine that the UE acquires a right to use an unlicensed carrier:

Criterion 1: if channel idleness is detected by the first CCA, it is determined that the UE acquires the right to use the unlicensed carrier;

Criterion 2: if channel idleness is detected by one of a plurality of first CCAs, it is determined that the UE acquires the right to use the unlicensed carrier; and Criterion 3: if the value of N is reduced to 0 progressively, it is determined that the UE acquires the right to use the unlicensed carrier.

It is to be understood by those skilled in the art that function implementation of each unit in the information processing apparatus illustrated in FIG. 9 may be understood with reference to related descriptions of the above information processing method.

The above information processing apparatus is applicable to the UE.

In practice, the acquisition unit 91 and the processing unit 92 may be implemented by the information processing apparatus or may be implemented by a central processing unit (CPU), a micro processor unit (MPU), a digital signal processor (DSP) or a field programmable gate array (FPGA) in the UE to which the information processing apparatus belongs.

Embodiment 10

Figure 10:
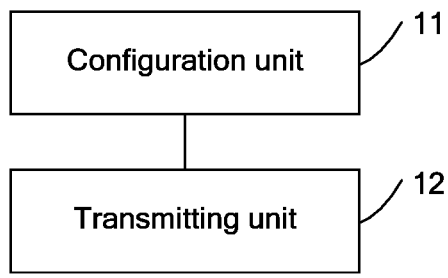
FIG. 10 is a structure diagram of another information processing apparatus according to an embodiment of the present disclosure.

FIG. 10 is a structure diagram of another information processing apparatus according to an embodiment of the present disclosure. As illustrated in FIG. 10, the apparatus includes:

a configuration unit 11 configured to set configuration information; and a transmitting unit 12 configured to transmit notification information that carries the configuration information to a UE, so that the UE acquires first information based on the notification information and performs contention-based access and transmits a SRS according to the first information.

The first information includes at least one of the followings: a frame structure, a LBT execution position, a SRS transmission position and dedicated indication signaling.

The notification message includes at least the following information: a time domain position where the SRS is transmitted by the UE, a SRS frequency domain pattern, an index number of a resource block without signal energy or a LBT execution pattern, and a LBT execution position.

It is to be understood by those skilled in the art that implemented functions of each unit in the information processing apparatus illustrated in FIG. 10 may be understood with reference to related descriptions of the above information processing method.

The above information processing apparatus is applicable to a base station.

In practice, the configuration unit 11 may be implemented by the information processing apparatus or may be implemented by a CPU, a MPU, a DSP or a FPGA in the base station to which the information processing apparatus belongs; and the transmitting unit 12 may be implemented by a transmitter.

Embodiments of the present disclosure further provide a computer storage medium, which is configured to store computer-executable instructions for executing the above information processing method.

For example, the storage medium is configured to store program codes for performing the following steps: acquiring first information; and performing contention-based access and transmitting a sounding reference signal (SRS) according to the first information, where the first information includes at least one of the followings: a frame structure, a listen-before-talk (LBT) execution position, a SRS transmission position and dedicated indication signaling.

The above descriptions are only for illustration. The storage medium may be further configured to store program codes for executing other steps of the information processing method involved in embodiments of the present disclosure. Details are not described herein again.

Embodiments of the present disclosure further provide an information processing system. The system includes a UE and a base station. The UE includes an information processing apparatus as illustrated in FIG. 9. The base station includes an information processing apparatus as illustrated in FIG. 10. Details are not described herein again.

It is to be understood that the apparatus and the method disclosed in embodiments of the present disclosure may be implemented in other ways. The apparatus embodiments described above are merely exemplary. For example, the unit division is merely logical function division, and, in practice, the unit division may be implemented in other ways. For example, multiple units or components may be combined or may be integrated into another system, or some features may be omitted or not executed. Additionally, coupling, direct coupling or communication connection between the presented or discussed components may be indirect coupling or communication connection, via interfaces, between devices or units, and may be electrical, mechanical or in other forms.

The units described above as separate components may or may not be physically separated. Components presented as units may or may not be physical units, i.e., may be located in one place or may be distributed over multiple network units. Part or all of these units may be selected according to actual requirements to achieve objects of solutions of embodiments of the present disclosure.

Moreover, various function units in embodiments of the present disclosure may all be integrated in one processing unit, or each unit may be used as a separate unit, or two or more units may be integrated into one unit. The integrated function unit may be implemented by hardware or may be implemented by hardware plus a software function unit.

It may be understood by those skilled in the art that all or part of the steps in the method embodiments described above may be implemented by hardware related to program instructions, these programs may be stored in a computer-readable storage medium, and, when executed, these programs execute steps including the method embodiments described above; and the preceding storage medium includes various media capable of storing program codes, such as a removable storage device, a read-only memory (ROM), a magnetic disk or an optical disk.

Alternatively, the above-mentioned integrated unit of the present disclosure may also be stored in a computer-readable storage medium if implemented in the form of a software function unit and sold or used as an independent product. Based on this understanding, solutions provided by embodiments of the present disclosure substantially, or the part contributing to the related art, may be embodied in the form of a software product. The software product is stored on a storage medium and includes several instructions for enabling a computer device (which may be a personal computer, a server or a network device) to execute all or part of the methods provided by embodiments of the present disclosure. The preceding storage medium includes various media capable of storing program codes, such as a removable storage device, a ROM, a magnetic disk or an optical disk.

The above are only preferred embodiments of the present disclosure and are not intended to limit the present disclosure. Any modifications, equivalent substitutions, improvements and the like made within the spirit and principle of the present disclosure are within the scope of the present disclosure.

INDUSTRIAL APPLICABILITY

In a process of information processing, first information is acquired; and contention-based access is performed and a SRS is transmitted according to the first information, where the first information includes at least one of the followings: a frame structure, a LBT execution position, a SRS transmission position and dedicated indication signaling. This solves a collision problem that occurs when a LBT detection position and a SRS transmission position are both on a last OFDM symbol of a subframe, improving a probability that a UE accesses a channel and increasing SRS transmission opportunities.

What is claimed is:

1. An information processing method, applied to a user equipment (UE), comprising:
   acquiring first information; and
   performing a listen-before-talk (LBT) and transmitting a sounding reference signal (SRS) according to the first information,
   wherein the first information comprises at least one of: a frame structure, a LBT execution position, a SRS transmission position or dedicated indication signaling,
   wherein:
      the SRS is transmitted on last M orthogonal frequency division multiplexing (OFDM) symbols of a scheduling subframe, wherein in response to determining that the LBT execution position is on the M symbols of the scheduling subframe, the SRS is transmitted through at least one of: in response to determining that symbols used for executing the LBT successfully occupy only part of M symbols, transmitting the SRS on remaining symbols of the M symbols or transmitting the SRS with the remaining symbols as a SRS transmission window; in response to determining that the symbols used for executing the LBT successfully occupy only the part of the M symbols, transmitting a reserved signal on the remaining symbols of the M symbols and transmitting the SRS on a configured SRS resource.

2. The method according to claim 1,
   wherein in response to determining that the LBT execution position is in the uplink subframe, a position where the LBT is executed comprises at least one of:
   last M OFDM symbols in the uplink subframe;
   the last M OFDM symbols in the uplink subframe and first L OFDM symbols in a next subframe; or
   all OFDM symbols in the uplink subframe,
   wherein M and L are positive integers, or M and L are configured through a base station or predefined; or
   in response to determining that the LBT execution position is in a special subframe, a position where the LBT is executed comprises at least one of:
   a last OFDM symbol of a guard period (GP) in the special subframe;
   last S OFDM symbols of the GP in the special subframe;
   the last S OFDM symbols of the GP in the special subframe and t OFDM symbols in an uplink pilot time slot (UpPTS);
   all OFDM symbols of the GP in the special subframe; or
   all the OFDM symbols of the GP in the special subframe and symbols in the UpPTS,
   wherein S and t are positive integers; or S and t are configured through a base station or predefined; or
   in response to determining that the LBT execution position is in a downlink subframe, a position where the LBT is executed comprises at least one of:
   a last OFDM symbol in the downlink subframe;
   a specific resource element (RE) on the last OFDM symbol in the downlink subframe;
   a symbol occupied by a downlink pilot time slot (DwPTS) in the special subframe;
   last M OFDM symbols of the DwPTS in the special subframe; or
   specific REs on OFDM symbols of the DwPTS in the special subframe.

3. The method according to claim 1, wherein a frequency domain position for the SRS transmission position comprises:
an entire frequency domain bandwidth on which the SRS is transmitted,
wherein the SRS frequency domain pattern is a subcarrier-level resource pattern.

4. The method according to claim 1, wherein
in response to determining that all the M symbols are occupied during the LBT process for detecting channel idleness, transmitting the SRS on the configured SRS resource,
wherein the configured SRS resource is a configured first OFDM symbol after executing a LBT resource position.

5. The method according to claim 1, wherein in response to determining that channel idleness is detected during a process of the LBT, the transmitting the SRS further comprises at least one of:
transmitting the DMRS in a fourth OFDM symbol of a subframe instead of transmitting the SRS;
multiplexing a DMRS resource to transmit the SRS; or
transmitting the SRS in a position of a last symbol of a first time slot of the subframe.

6. An information processing apparatus, applied to a UE, comprising a processor and a storage device for storing computer executable instructions that when executed by the processor cause the processor to perform the method of claim 1.

7. The method according to claim 1, wherein the SRSs for multiple UEs are transmitted simultaneously in the SRS transmission window by means of frequency division.

8. The method according to claim 1, wherein the SRS transmission window is one OFDM symbol.

9. The method according to claim 1, wherein a frequency domain position for the SRS transmission position comprises: an entire frequency domain bandwidth on which the SRS is transmitted,
wherein the SRS frequency domain pattern is a resource-block-level resource pattern.

10. The method according to claim 1, wherein a frequency domain position for the SRS transmission position comprises: a specific SRS frequency domain pattern according to which the SRS is transmitted.

11. The method according to claim 1, wherein the first information is acquired through predefined information.

12. The method according to claim 1, wherein the first information is acquired based on configuration of a base station.

13. The method according to claim 1, wherein the first information is acquired based on configuration of the UE.

14. The method according to claim 1, wherein in response to determining that all the M symbols are occupied during the LBT process for detecting channel idleness, transmitting the SRS on the configured SRS resource,
wherein the configured SRS resource is a configured last OFDM symbol of a next subframe of the LBT resource position.

15. The method according to claim 1, wherein in response to determining that all the M symbols are occupied during the LBT process for detecting channel idleness, transmitting the SRS on the configured SRS resource,
wherein the configured SRS resource is a configured SRS transmission window after the LBT resource position.

16. The method according to claim 1, wherein the SRSs for multiple UEs are transmitted simultaneously in the SRS transmission window by means of time division.

17. The method according to claim 1, wherein the SRSs for multiple UEs are transmitted simultaneously in the SRS transmission window by means of code division.

18. An information processing method, applied to a user equipment (UE), comprising:
acquiring first information; and
performing contention-based access and transmitting a sounding reference signal (SRS) according to the first information,
wherein acquiring first information comprises at least one of the followings:
acquiring the first information through predefined information;
acquiring the first information based on configuration of a base station; or
acquiring the first information based on configuration of the UE,
wherein the first information comprises at least one of: a frame structure, a listen-before-talk (LBT) execution position, a SRS transmission position or dedicated indication signaling,
wherein the SRS is transmitted in at least one manner of:
in response to determining that both of the LBT execution position and the SRS transmission position are on a last orthogonal frequency division multiplexing (OFDM) symbol of a scheduling subframe, a process of transmitting the SRS and a process of executing the LBT coexist on one symbol by frequency division; or the process of transmitting the SRS and the process of executing the LBT coexist on one symbol by time division,
wherein in response to determining that the process of transmitting the SRS and the process of executing the LBT coexist on one symbol by frequency division, the SRS is transmitted by the UE on the last OFDM symbol of the scheduling subframe according to a SRS frequency domain pattern is notified to the UE by a base station; and a clear channel assessment (CCA) detection is performed by the UE on a last OFDM symbol of a subframe previous to the scheduling subframe according to a CCA pattern is notified to the UE by the base station, wherein a guard period is allowed to be reserved between a frequency domain resource corresponding to the process of transmitting the SRS and a frequency domain resource corresponding to the CCA detection; wherein in response to determining that the process of transmitting the SRS and the process of executing the LBT coexist on one symbol by time division, executing the LBT, by the UE, on part of resources of a last OFDM symbol of a subframe previous to the scheduling subframe, and transmitting the SRS on remaining resources if the LBT is executed successfully by the UE on the part of the resources; or
in response to determining that the LBT execution position is on a last OFDM symbol of a subframe previous to the scheduling subframe and the SRS transmission position is on a first OFDM symbol of the scheduling subframe, the SRS is transmitted as follows: performing a corresponding LBT operation by the UE within a duration of one OFDM symbol; and transmitting a reserved signal of a non-complete symbol, and transmitting the SRS on the first OFDM symbol of the scheduling subframe according to the SRS frequency domain pattern or transmitting the SRS on the first OFDM symbol of the scheduling subframe throughout a frequency domain bandwidth in response to determining that the UE performs the CCA detection successfully on the last OFDM symbol of the subframe previous to the scheduling subframe and a time when the CCA detection succeeds is not beyond a symbol boundary.

19. The method according to claim 18, wherein before the UE transmits the SRS on the last OFDM symbol of the scheduling subframe and performs the CCA, the method further comprises:
receiving a notification message transmitted from the base station, wherein the notification message comprises at least one of: a time domain position where the SRS is transmitted by the UE, the SRS frequency domain pattern, an index number of a resource block without signal energy or a LBT execution pattern, or the LBT execution position.

20. An information processing method, applied to a base station, comprising:
transmitting notification information to a UE, so that the UE acquires first information based on the notification information, and performs a listen-before-talk (LBT) and transmits a sounding reference signal (SRS) according to the first information,
wherein the first information comprises at least one of: a frame structure, a LBT execution position, a SRS transmission position or dedicated indication signaling;
wherein the notification message comprises at least one of: a time domain position where the SRS is transmitted by the UE, a SRS frequency domain pattern, an index number of a resource block without signal energy or a LBT execution pattern, or a LBT execution position, wherein the SRS is transmitted on last M orthogonal frequency division multiplexing (OFDM) symbols of a scheduling subframe, wherein in response to determining that the LBT execution position is on the M symbols of the scheduling subframe, the SRS is transmitted through at least one of: in response to determining that symbols used for executing the LBT successfully occupy only part of M symbols, transmitting the SRS on remaining symbols of the M symbols or transmitting the SRS with the remaining symbols as a SRS transmission window; in response to determining that the symbols used for executing the LBT successfully occupy only the part of the M symbols, transmitting a reserved signal on the remaining symbols of the M symbols and transmitting the SRS on a configured SRS resource.

* * * * *

UNITED STATES PATENT AND TRADEMARK OFFICE
CERTIFICATE OF CORRECTION

PATENT NO. : 10,743,354 B2  
APPLICATION NO. : 15/751138  
DATED : August 11, 2020  
INVENTOR(S) : Ling Yang Page 1 of 1

It is certified that error appears in the above-identified patent and that said Letters Patent is hereby corrected as shown below:

In the Drawings

On Sheet 3 of 4, FIG. 6, Line 4 (Approx.), delete "positon" and insert --position--.

In the Specification

In Column 4, Line 12, delete "relating determining" and insert --determining--.

In Column 4, Line 35, delete "division" and insert --division.--.

In Column 7, Line 42, delete "successfully" and insert --successfully.--.

In Column 8, Line 13, delete "signaling" and insert --signaling.--.

In Column 8, Line 40, delete "division" and insert --division.--.

In Column 9, Lines 17-18, delete "boundary" and insert --boundary.--.

In Column 24, Line 11, delete "and or" and insert --and/or--.

In the Claims

In Column 32, Line 34, Claim 2, delete "the" and insert --a--.

In Column 34, Line 37, Claim 18, after "pattern" delete "is".

In Column 34, Line 41, Claim 18, after "pattern" delete "is".

Signed and Sealed this  
Thirtieth Day of March, 2021

Drew Hirshfeld  
*Performing the Functions and Duties of the*  
*Under Secretary of Commerce for Intellectual Property and*  
*Director of the United States Patent and Trademark Office*